(12) United States Patent
Osaki et al.

(10) Patent No.: US 9,093,932 B2
(45) Date of Patent: Jul. 28, 2015

(54) CONTROL SYSTEM FOR THREE-PHASE ROTARY MACHINE

(71) Applicant: DENSO CORPORATION, Kariya, Aichi-pref. (JP)

(72) Inventors: Akimasa Osaki, Chiryu (JP); Kiyoshi Fujii, Kasugai (JP); Hideki Kabune, Nagoya (JP); Kouichi Nakamura, Toyota (JP)

(73) Assignee: DENSO CORPORATION, Kariya (JP)

( * ) Notice: Subject to any disclaimer, the term of this patent is extended or adjusted under 35 U.S.C. 154(b) by 11 days.

(21) Appl. No.: 14/140,922

(22) Filed: Dec. 26, 2013

(65) Prior Publication Data

US 2014/0176027 A1  Jun. 26, 2014

(30) Foreign Application Priority Data

Dec. 26, 2012 (JP) ................................ 2012-282015

(51) Int. Cl.
*H02P 6/00* (2006.01)
*H02P 27/08* (2006.01)
*H02P 21/05* (2006.01)

(52) U.S. Cl.
CPC ............. *H02P 6/002* (2013.01); *H02P 21/05* (2013.01); *H02P 27/08* (2013.01)

(58) Field of Classification Search
CPC ..................................................... H02P 6/002
USPC ............................... 318/400.2, 400.01, 700
See application file for complete search history.

(56) References Cited

U.S. PATENT DOCUMENTS

| 7,482,777 B2 * | 1/2009 | Tomigashi ................ 318/807 |
| 7,598,698 B2 * | 10/2009 | Hashimoto et al. ......... 318/801 |
| 2010/0165682 A1 | 7/2010 | Sakakibara |
| 2012/0001581 A1 | 1/2012 | Sumita et al. |
| 2012/0106217 A1 | 5/2012 | Sakakibara |

FOREIGN PATENT DOCUMENTS

| JP | 2005-269880 | 9/2005 |
| JP | 2012-016118 | 1/2012 |
| JP | 4983322 | 5/2012 |
| WO | WO 2008/035544 | 3/2008 |

OTHER PUBLICATIONS

Office Action (2 pages) dated Mar. 31, 2015, issued in corresponding Japanese Application No. 2012-282015 and English translation (3 pages).

* cited by examiner

*Primary Examiner* — David S Luo
(74) *Attorney, Agent, or Firm* — Nixon & Vanderhye, P.C.

(57) ABSTRACT

In a system, a triangular carrier wave is compared in magnitude with first and second two-phase modulated command signals. Based on a result of the comparison, on-off operations of the high- and low-side switching elements of two phases of a three-phase inverter corresponding to the first and second two-phase modulated command signals are performed while the high- and low-side switching elements of the remaining phase of the three-phase inverter is fixed to be on or off. A value of a current flowing through a first or second bus connected between a DC power source and the three-phase inverter is measured when a local peak of the triangular carrier signal occurs while none of the high-side switching elements of all the three-phases are on or none of the low-side switching elements of all the three-phases are on.

12 Claims, 20 Drawing Sheets

| OUTPUT VOLTAGE VECTOR | ON SIDE | | | IDC |
|---|---|---|---|---|
| V0 | Sun | Svn | Swn |  |
| V1 | Sup | Svn | Swn | −iu |
| V2 | Sup | Svp | Swn | iw |
| V3 | Sun | Svp | Swn | −iv |
| V4 | Sun | Svp | Swp | iu |
| V5 | Sun | Svn | Swp | −iw |
| V6 | Sup | Svn | Swp | iv |
| V7 | Sup | Svp | Swp |  |

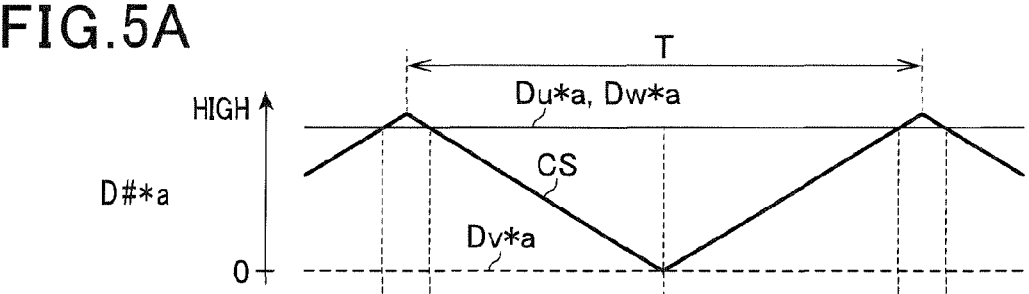
FIG.5A
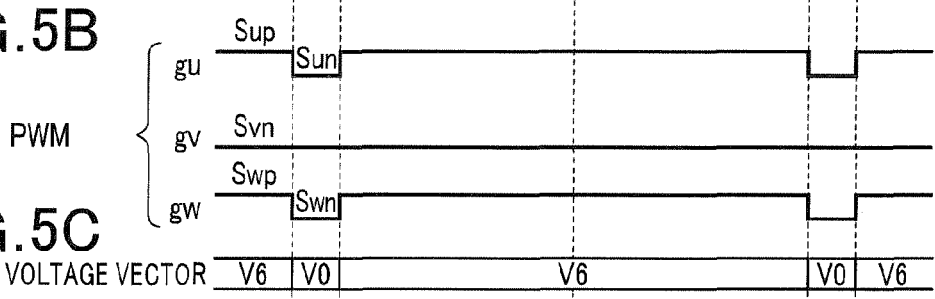
FIG.5B
FIG.5C
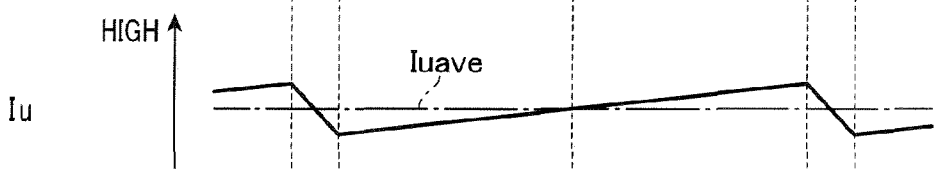
FIG.5D
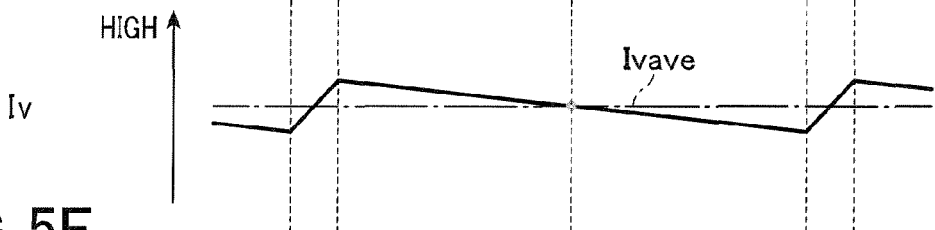
FIG.5E
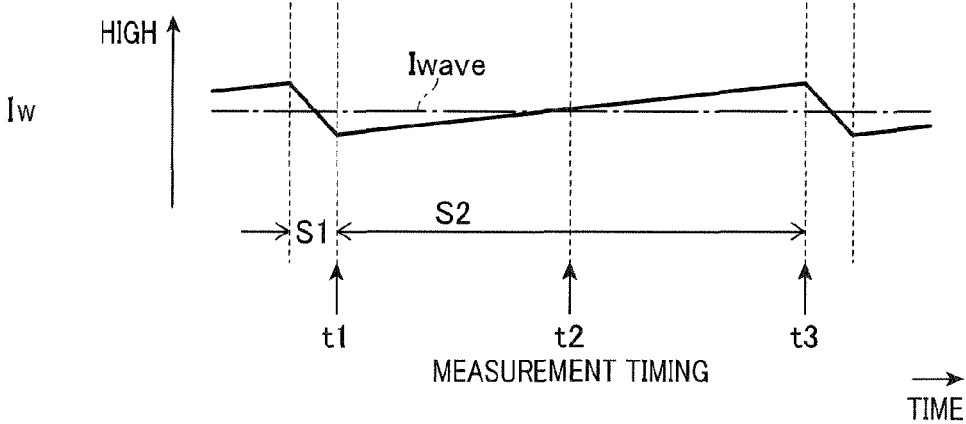
FIG.5F FIG.8A
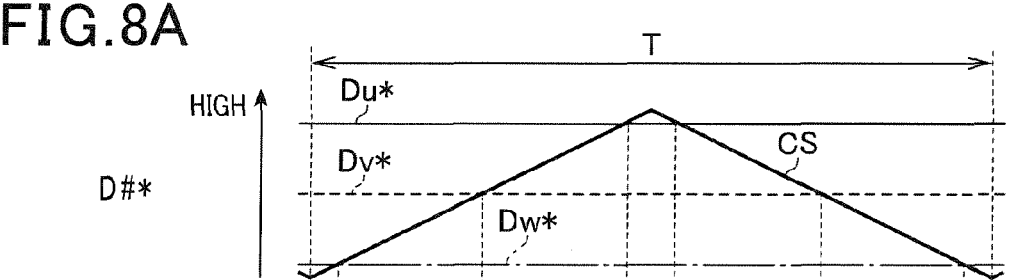
FIG.8B
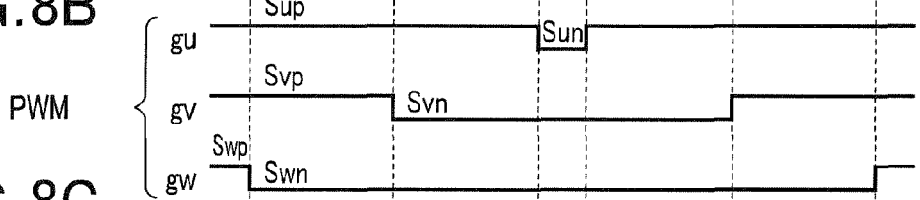
FIG.8C
OUTPUT VOLTAGE VECTOR | V7 | V2 | V1 | V0 | V1 | V2 | V7 |
FIG.8D
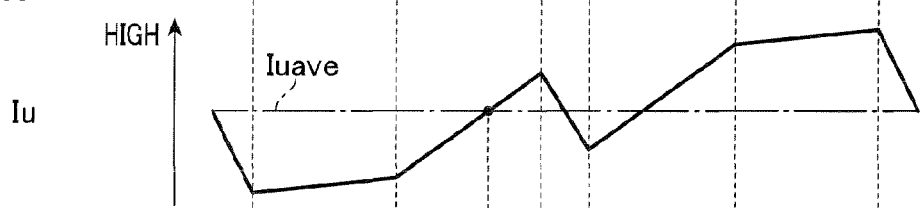
FIG.8E
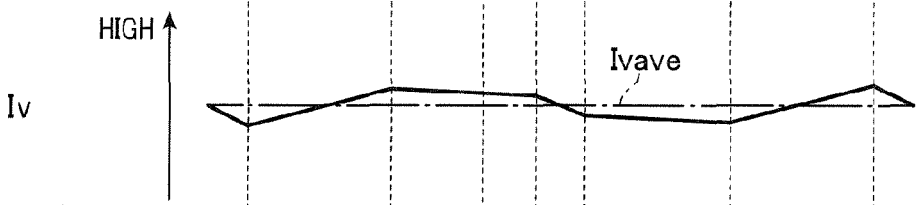
FIG.8F
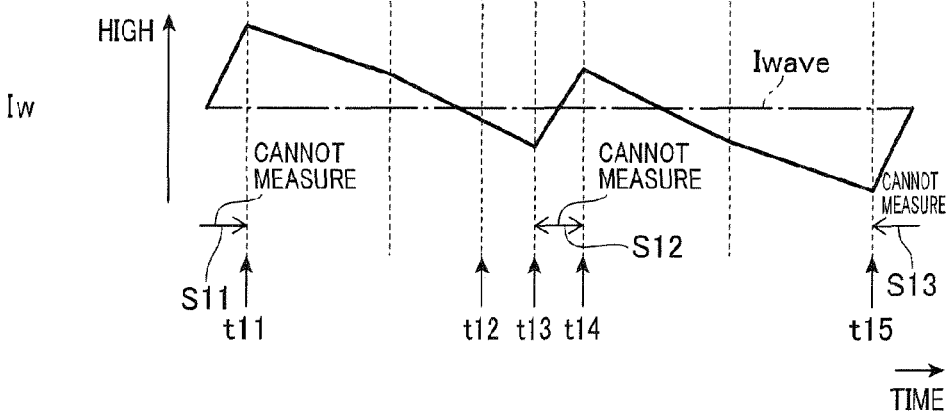

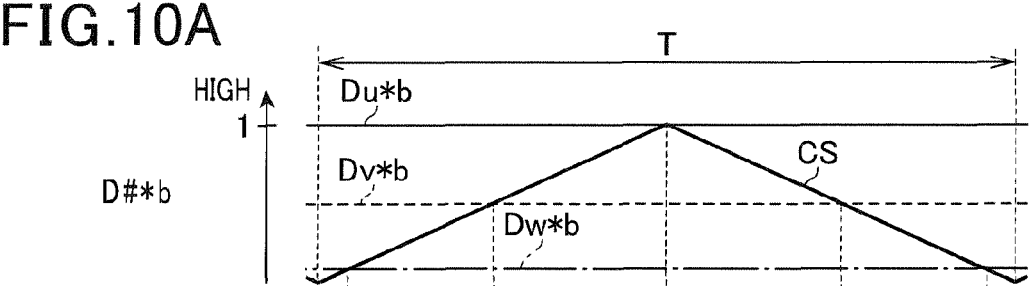
FIG.10A
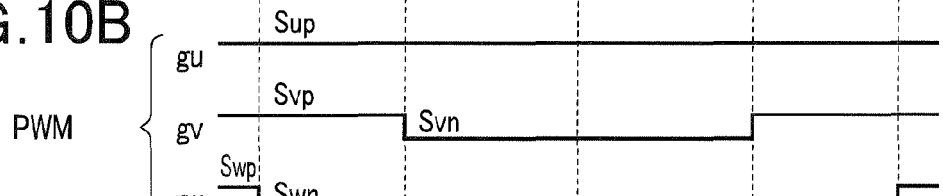
FIG.10B
FIG.10C
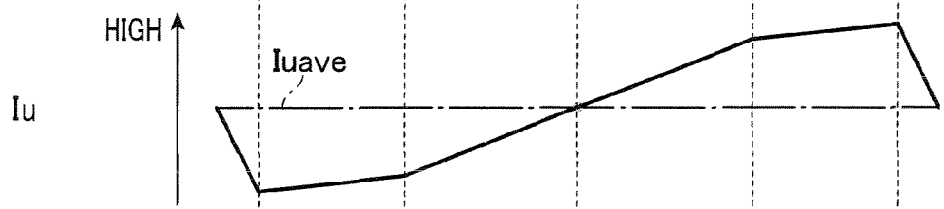
FIG.10D
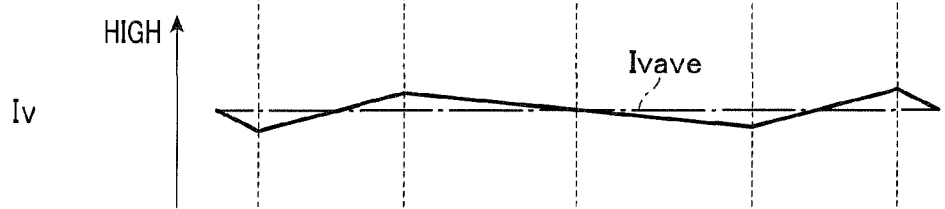
FIG.10E
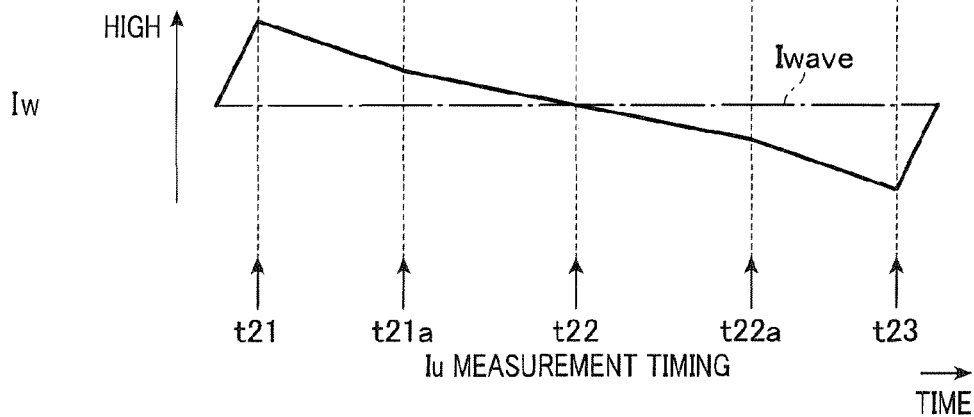
FIG.10F Dv*c={Vv*/(VDC/2)}  Dw*c={Vw*/(VDC/2)}  Du*c={Vu*/(VDC/2)}

FIG.13A
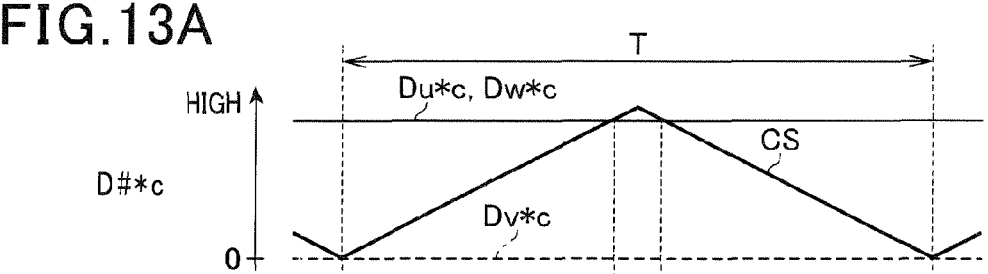
FIG.13B
FIG.13C
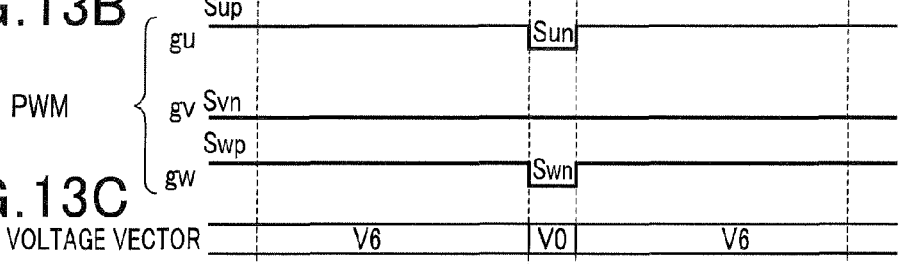
FIG.13D
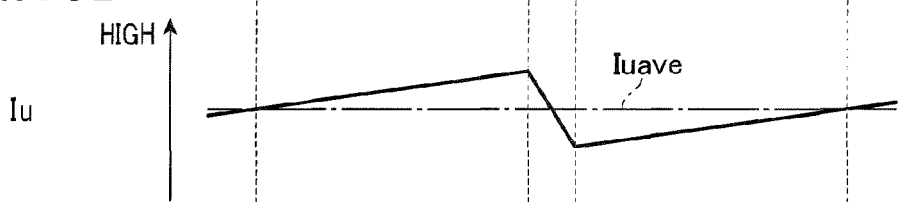
FIG.13E
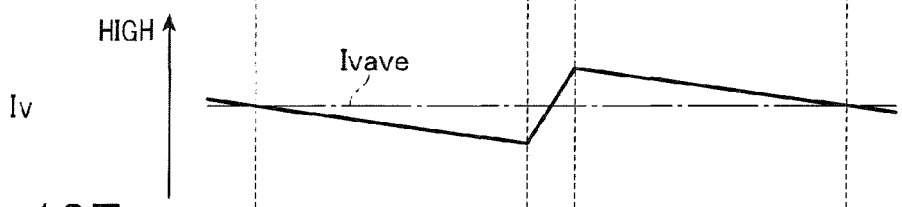
FIG.13F
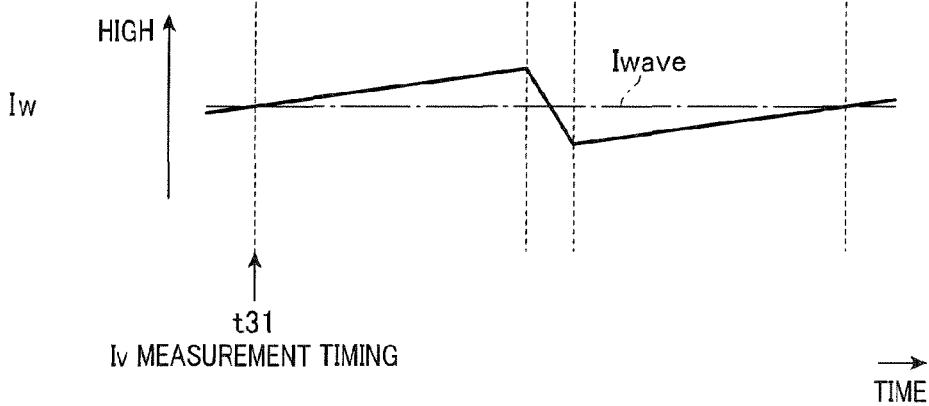

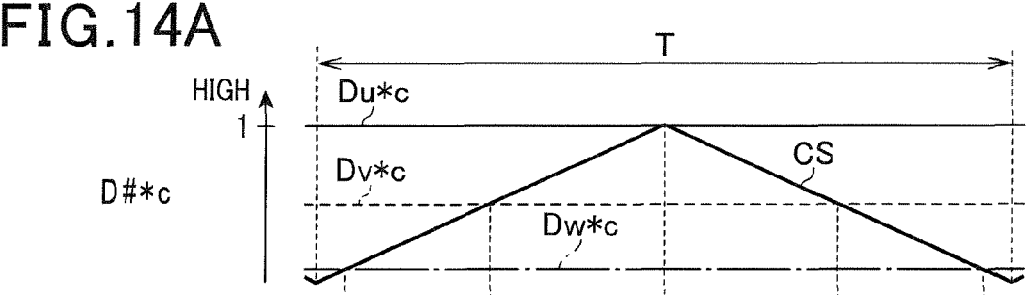
FIG.14A
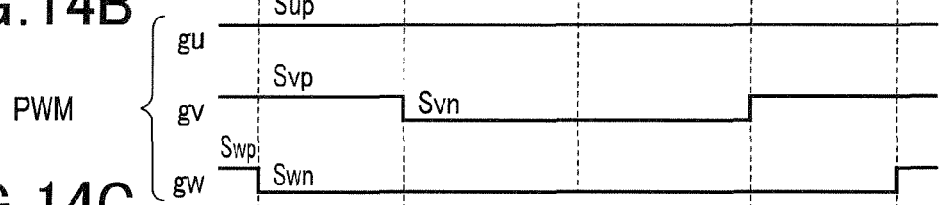
FIG.14B
FIG.14C
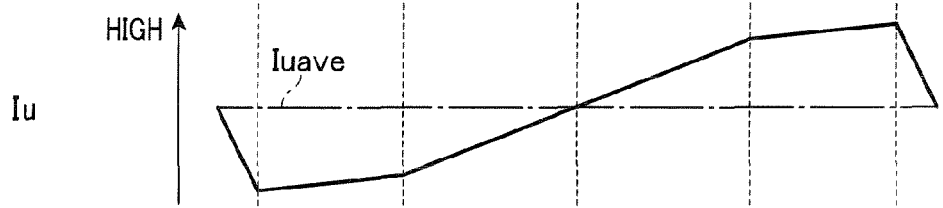
FIG.14D
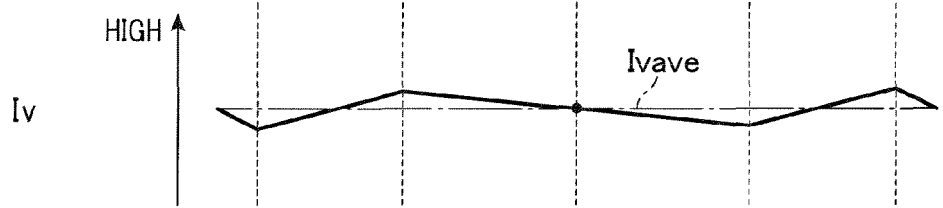
FIG.14E
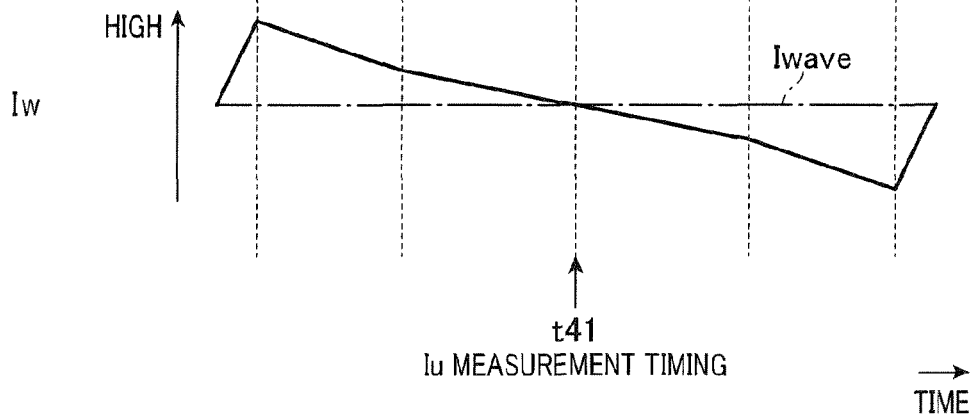
FIG.14F
t41
Iu MEASUREMENT TIMING

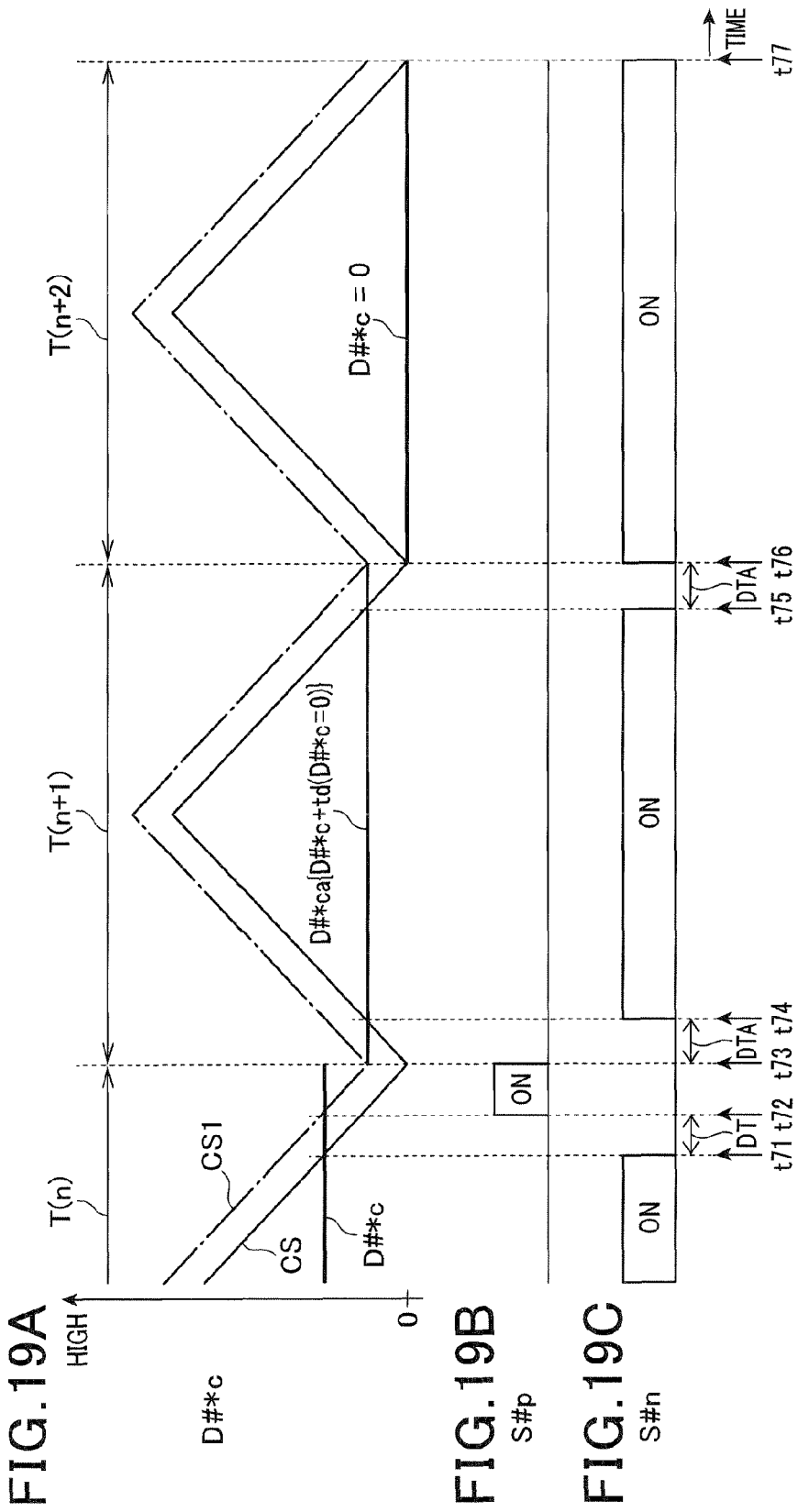

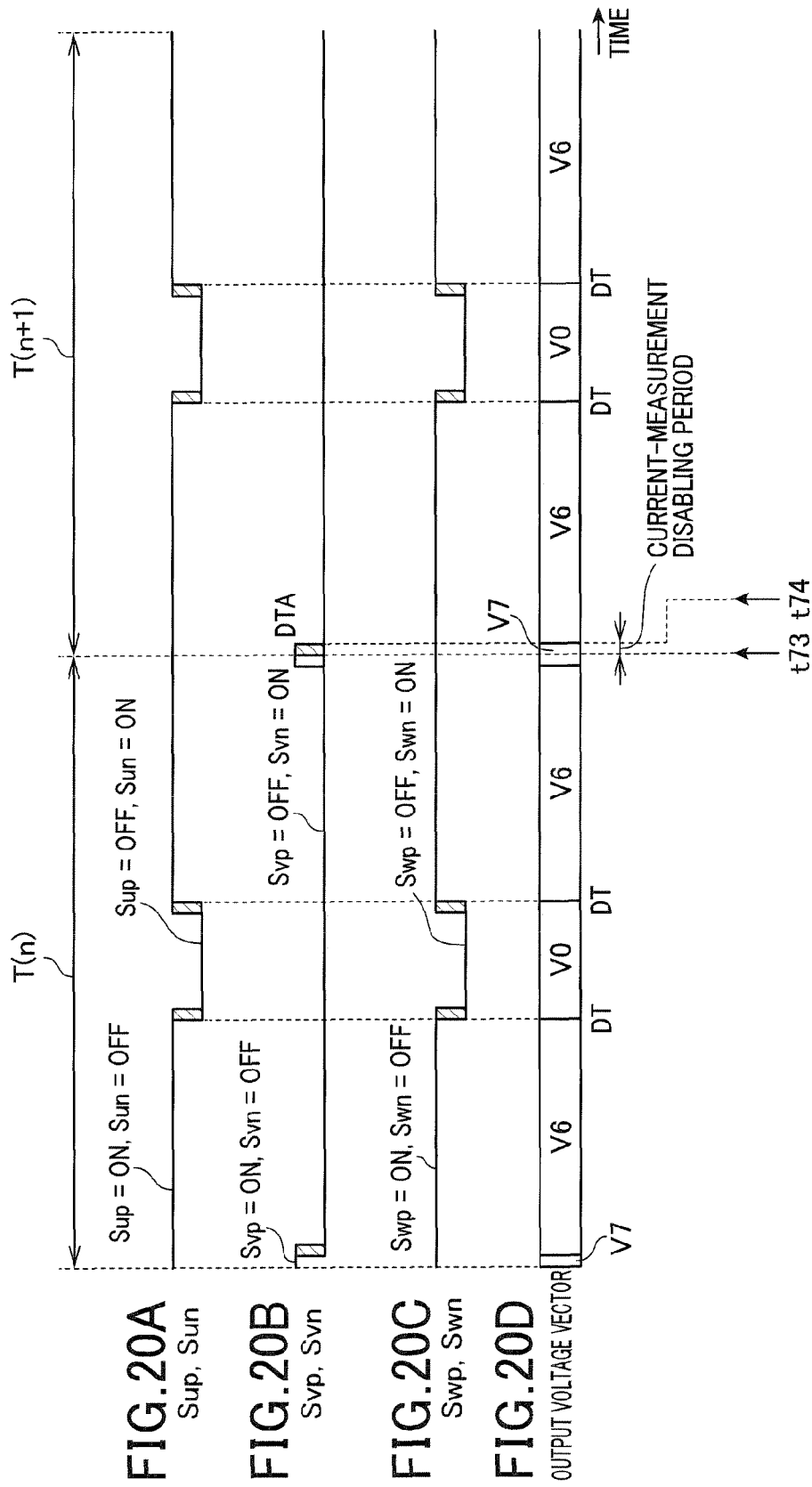

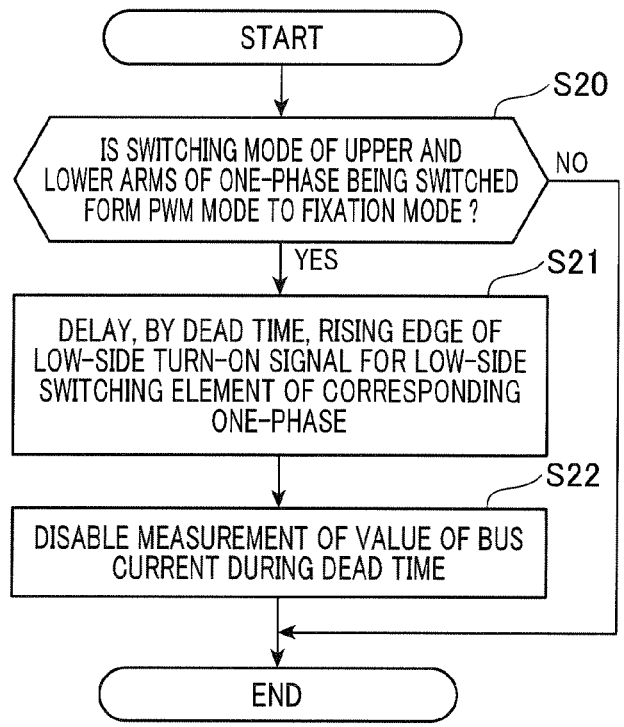

OUTPUT VOLTAGE VECTOR

Iu

CONTROL SYSTEM FOR THREE-PHASE ROTARY MACHINE

CROSS REFERENCE TO RELATED APPLICATIONS

This application is based on and claims the benefit of priority from Japanese Patent Application 2012-282015 filed on Dec. 26, 2012, the disclosure of which is incorporated in its entirety by reference.

TECHNICAL FIELD

The present disclosure relates to control systems for controlling a three-phase inverter that converts direct-current (DC) power to given alternating-current (AC) power to be supplied to a three-phase rotary machine, thus controlling the three-phase rotary machine.

BACKGROUND

There are various types of control systems for three-phase rotary machines. These control systems include an inverter comprised of three pairs of high- and low-side switching elements; each pair of high- and low-side switching elements is provided for a corresponding phase of a three-phase rotary machine. The control systems perform on-off operations of the high- and low-side switching elements of each pair to convert a DC voltage supplied from a DC power source to an AC voltage, and supply the AC voltage to the three-phase rotary machine as an output voltage of the inverter, thus outputting torque that rotates a rotor of the three-phase rotary machine.

In the control systems, there is known a control system for a three-phase motor as an example of these three-phase rotary machines, which is disclosed in Japanese Patent Publication No. 4983322.

The control system disclosed in the Patent Publication uses a negative bus connected between a negative DC input terminal of the inverter and a negative terminal of the DC power source as a feedback loop to measure a peak value of a current flowing through the negative bus; this current will be referred to as a bus current.

For example, the control system includes a current measuring circuit comprised of a shunt resistor and a peak-hold circuit. The shunt resistor is provided in the negative bus. The peak hold circuit is operative to measure a voltage drop across the shunt resistor while the bus current is flowing through the shunt resistor, measure the bus current as a phase current using the voltage drop, and hold a peak value of the phase current. That is, a current for one of the three-phases of the three-phase rotary machine will be referred to as a phase current.

Based on the peak value of a phase current, the control system corrects a command value for the output voltage of a three-phase inverter as a feedforward manipulated variable therefor; the command value is proportional to the rotational speed of the three-phase motor. The control system generates, based on the corrected command value, drive signals each having a controllable duty cycle, i.e., a controllable on-pulse width for each cycle using PWM (Pulse Width Modulation). Then, the control system individually drives each of the high- and low-side switching elements according to a corresponding one of the drive signals to control an output voltage of the three-phase inverter to be supplied to the three-phase motor.

SUMMARY

In the aforementioned control system, the operating state of the inverter is cyclically changed depending on an on state or off state of each of the high- and low-side switching elements of the three-phase inverter.

It is known that ringing takes place in the bus current at the moment when a present operating state of the inverter is being changed to another operating state. The ringing taking place in the bus current means repeated overshoots and undershoots in the bus current.

On that point, in the aforementioned control system, because when a value of the measured bus current is not fixedly determined, the measured value of the bus current may include noise due to the ringing, resulting in difficulty measuring a value of the bus current with high accuracy.

In view of the circumstances set forth above, one aspect of the present disclosure seeks to provide control systems for a three-phase rotary machine, which are capable of addressing such a problem set forth above.

Specifically, an alternative aspect of the present disclosure aims to provide such control systems, each of which is capable of measuring a value of the bus current with high accuracy while reducing the influence of noise due to ringing.

According to an exemplary aspect of the present disclosure, there is provided a system for controlling a three-phase inverter, having high- and low-side switching elements for each phase thereof, for supplying, based on direct-current (DC) power from a DC power source, alternating-current (AC) power to a three-phase rotary machine for rotating the three-phase rotary machine. The system includes a two-phase modulation module configured to perform two-phase modulation on three-phase command signals for controlling the three-phase inverter, each having a predetermined amplitude, to generate two-phase modulated command signals for the three-phases of the three-phase inverter. The two-phase modulated command signals are configured such that one of the two-phase modulated command signals is successively selected to be fixed to one of an upper limit and a lower limit of a corresponding one of the three-phase command signals for each predetermined period. Two of the two-phase modulated command voltage signals except for one of the two-phase modulated command signals fixed to one of the upper limit and the lower limit are referred to as first and second two-phase modulated command signals. The system includes an on-off performing module configured to compare in magnitude a triangular carrier wave, having a predetermined amplitude based on the amplitude of each of the three-phase command signals, with the first and second two-phase modulated command signals. The on-off performing module is configured to perform, based on a result of the comparison, on-off operations of the high- and low-side switching elements of two phases of the three-phase inverter corresponding to the first and second two-phase modulated command signals while fixing, to be on or off, the high- and low-side switching elements of a remaining phase of the three-phase inverter. The system includes a current measuring module configured to measure a value of a current flowing through one of first and second buses connected between the DC power source and the three-phase inverter when a local peak of the triangular carrier signal occurs while none of the high-side switching elements of all the three-phases are on or none of the low-side switching elements of all the three-phases are on.

This configuration generates the duration of an effective voltage vector of the three-phase inverter having its center timing corresponding to the occurrence of a local peak of the triangular carrier signal while none of the high-side switching elements of all the three-phases are on or none of the low-side switching elements of all the three-phases are on. Ringing takes place in the bus current at the moment when a present operating state of the inverter is being changed to another operating state. For this reason, measuring a value of the bus current at the center timing of the duration of an effective voltage vector corresponding to a local peak of the triangular carrier signal makes it possible to reduce influence of ringing from the measured value. This results in an increase of the accuracy of measuring a value of the bus current.

In addition, this configuration easily fixes a timing to measure a value of the bus current to a timing when a local peak of the triangular carrier signal occurs without using additional hardware components.

The above and/or other features, and/or advantages of various aspects of the present disclosure will be further appreciated in view of the following description in conjunction with the accompanying drawings. Various aspects of the present disclosure can include or exclude different features, and/or advantages where applicable. In addition, various aspects of the present disclosure can combine one or more feature of other embodiments where applicable. The descriptions of features, and/or advantages of particular embodiments should not be construed as limiting other embodiments or the claims.

BRIEF DESCRIPTION OF THE DRAWINGS

Other aspects of the present disclosure will become apparent from the following description of embodiments with reference to the accompanying drawings in which:

FIGS. 5A to 5F are a joint timing chart schematically illustrating an example of specific operations of a two-phase PWM task executed by a controller illustrated in FIG. 1;

FIGS. 8A to 8F are a joint timing chart schematically illustrating an example of specific operations of a three-phase PWM task executed by the controller illustrated in FIG. 1;

FIGS. 10A to 10F are a joint timing chart schematically illustrating an example of specific operations of a second two-phase PWM task executed by the controller according to the second embodiment;

FIGS. 13A to 13F are a joint timing chart schematically illustrating an example of specific operations of a third two-phase PWM task executed by the controller according to the third embodiment at a part of the graph illustrated in FIG. 12 corresponding to the rotational angle of 30° of a motor or thereabout;

FIGS. 14A to 14F are a joint timing chart schematically illustrating an example of specific operations of the third two-phase PWM task executed by the controller according to the third embodiment at a part of the graph illustrated in FIG. 12 corresponding to the rotational angle of 120° of the motor 10 or thereabout;

FIGS. 19A to 19C are a joint timing chart, which correspond to respective FIGS. 14A to 14C, schematically illustrating an example of specific operations of a dead-time setting task executed by the controller according to a sixth embodiment of the present disclosure;

FIGS. 20A to 20D are a joint timing chart schematically illustrating how three-phase switching elements vary during an n-th PWM cycle and a (n+1)-th PWM cycle according to the sixth embodiment;

FIG. 20E is a flowchart schematically illustrating an example of important steps of a dead-time setting task according to the sixth embodiment;

DETAILED DESCRIPTION OF EMBODIMENT

Figure 1:
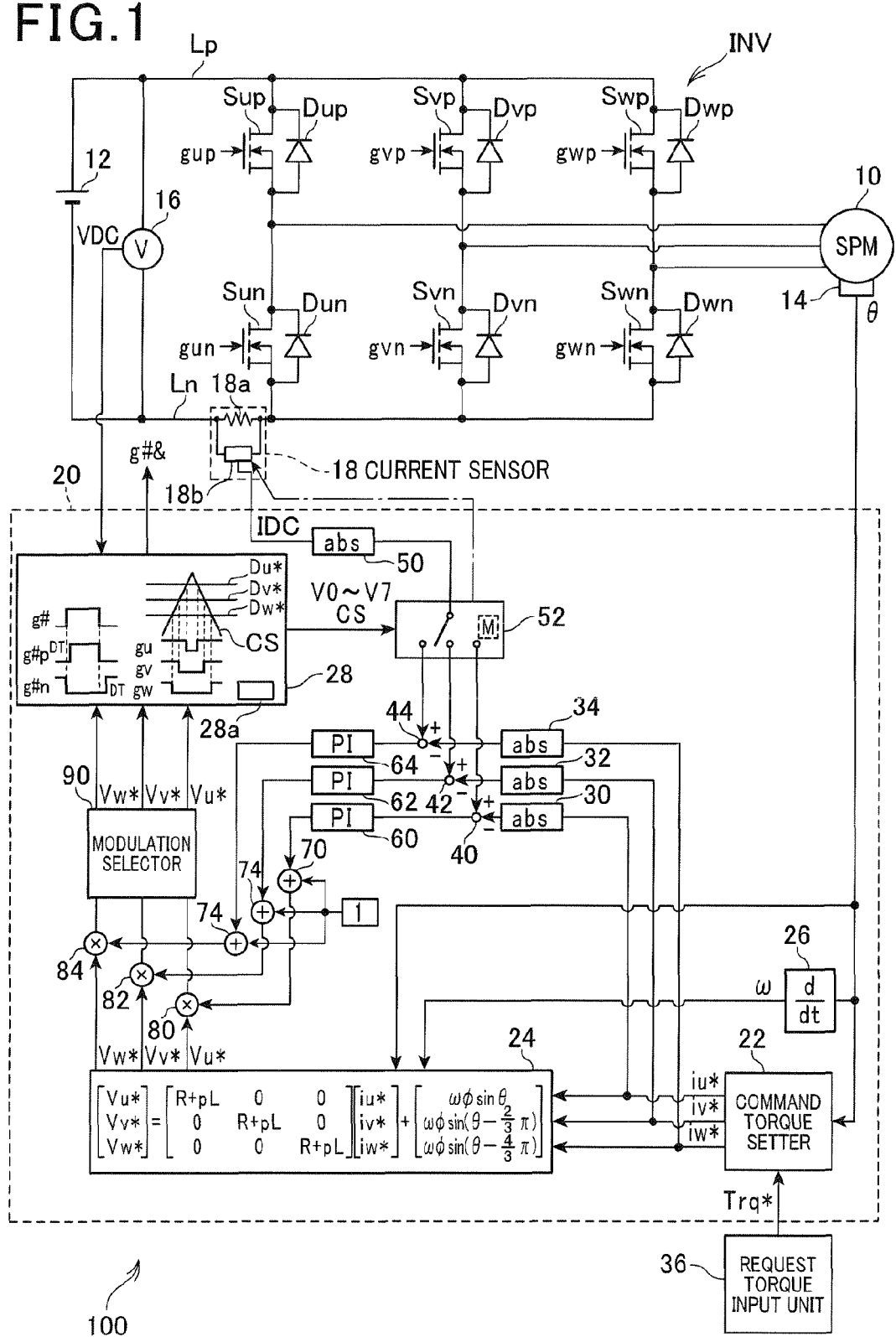
FIG. 1 is a circuit diagram of a control system according to a first embodiment of the present disclosure.

Embodiments of the present disclosure will be described hereinafter with reference to the accompanying drawings. In the embodiments, redundant descriptions of like parts between the embodiments, to which like reference characters are assigned, are omitted or simplified.

First Embodiment

Referring to FIG. 1, there is illustrated a system 100 for controlling a three-phase motor 10 as an example of three-phase rotary machines installed in, for example, an electric power steering system for motor vehicles according to the first embodiment. In the first embodiment, the three-phase motor 10 is a three-phase synchronous motor. More specifically, an SPMSM (Surface Permanent Magnet Synchronous Motor) is used in the first embodiment.

The control system 100 is equipped with a three-phase inverter INV, a battery, i.e. a DC power source, 12, and a controller 20.

Specifically, the three-phase motor 10 and the battery 12 can establish electrical connection therebetween via the inverter INV and a pair of positive bus Lp and negative bus Ln.

For example, the three-phase motor 10 is provided with an annular rotor having an iron rotor core. The rotor core is coupled to an assist mechanism of the electric power steering system; the assist mechanism is mechanically coupled to a steering shaft of the motor vehicle to which a steering wheel is coupled.

Specifically, the rotor core of the rotor is provided at its outer circumferential surface with at least one pair of permanent magnets. The permanent magnets of the at least one pair are symmetrically arranged with respect to the center axis of the rotor core at regular intervals therebetween in a circumferential direction of the rotor core.

One permanent magnet of the at least one pair has a north pole (N pole) directed radially outward away from the center of the rotor core. The other permanent magnet has a south pole (S pole) directed radially outward away from the center of the rotor core.

The three-phase motor 10 is also provided with a stator, i.e. an armature. The stator includes a stator core with, for example, an annular shape in its lateral cross section. The stator core is disposed, for example, around the outer periphery of the rotor core such that the inner periphery of the stator core is opposite to the outer periphery of the rotor core with a predetermined air gap.

The stator also includes a set of three-phase windings (armature windings) wound in the stator such that the U-, V-, and W-phase windings are shifted by an electric angle of, for example, 120°, i.e. $2\pi/3$ radian, in phase from each other.

For example, the three-phase armature windings (U-, V-, and W-phase windings) each have one end connected to a common junction (neutral point) and the other end to a separate terminal in, for example, a star-configuration.

The three-phase motor, referred to simply as a motor, 10 is operative to receive, at its three-phase windings, three-phase currents to generate a rotating magnetic flux; this allows the rotor to turn based on magnetic attractive force between the rotating magnetic flux and a magnetic flux of the rotor.

The three-phase inverter, referred to simply as an inverter, INV serves as, for example, a circuit configured to output an AC (Alternating Current) voltage to be applied to the motor 10. The inverter INV is provided with a first pair of series-connected high- and low-side (upper- and lower-arm) switching elements Sup and Sun for U-phase of the motor 10, a second pair of series-connected high- and low-side (upper- and lower-arm) switching elements Svp and Svn for V-phase of the motor 10, and a third pair of series-connected high- and low-side (upper- and lower-arm) switching elements Swp and Swn for W-phase of the motor 10. The inverter INV is also provided with flywheel diodes D#& (#=u, v, w, &=p, n) electrically connected in antiparallel to the corresponding switching elements S#& (#=u, v, w, &=p, n), respectively. Hereinafter, the first pair of high- and low-side switching elements Sup and Sun will also be referred to as U-phase high- and low-side switching elements, and the second pair of high- and low-side switching elements Svp and Svn will also be referred to as V-phase high- and low-side switching elements. Similarly, the third pair of high- and low-side switching elements Swp and Swn will also be referred to as W-phase high- and low-side switching elements.

In the first embodiment, as the switching elements S#& (#=u, v, w, &=p, n), power MOSFETs are respectively used. When power MOSFETs are used as the switching elements S#& (#=u, v, w, &=p, n), intrinsic diodes of the power MOSFETs can be used as the flywheel diodes, thus eliminating the flywheel diodes. IGBTs can be used as the switching elements S#& (#=u, v, w, &=p, n).

The first to third pairs of switching elements are parallely connected to each other in bridge configuration.

A connecting point through which the switching elements Sup and Sun of the first pair are connected to each other in series is connected to an output lead extending from the separate terminal of the U-phase winding. Similarly, a connecting point through which the switching elements Svp and Svn of the second pair are connected to each other in series is connected to an output lead extending from the separate end of the V-phase winding. Moreover, a connecting point through which the switching elements Swp and Swn of the third pair are connected to each other in series is connected to an output lead extending from the separate end of the W-phase winding. The separate terminals of the U-, V-, and W-phase windings of the motor 10 serve as AC power input terminals of the motor 10 to which three-phase AC power are input from the inverter INV.

One end of the series-connected switching elements of each of the first, second, and third pairs, such as the drain of a corresponding high-side switching element, serves as a positive input terminal of the inverter INV for a corresponding phase of the motor 10. The positive input terminals of the inverter INV for the respective phases of the motor 10 are connected to the positive terminal of the battery 12 via the positive bus Lp. The other end of the series-connected switching elements of each of the first, second, and third pairs, such as the source of a corresponding low-side switching element, serves as a negative input terminal of the inverter INV for a corresponding phase of the motor 10. The negative input terminals of the inverter INV for the respective phases of the motor 10 are connected to the negative terminal of the battery 12 via the negative bus Ln.

The control system 100 is equipped with, as means for detecting operating conditions of each of the motor 10 and the inverter INV, a rotational angle sensor 14, a voltage sensor 16, and a current sensor 18.

The rotational angle sensor 14 is communicable with the controller 20, and operative to measure a rotational angle of the motor 10, i.e. an electric angle θ of the rotor with respect to the stator, and output the measured rotational angle θ of the motor 10 to the controller 20.

The voltage sensor 16 is arranged to allow measurement of an input voltage (power supply voltage) VDC to be applied to the inverter INV. The voltage sensor 16 is communicable with the controller 20, and operative to send, to the controller 20, the inverter input voltage VDC to be applied to the inverter INV.

The current sensor 18 is communicable with the controller 20, and arranged to allow measurement of a value of current flowing through the negative bus Ln. The current flowing through the negative bus Ln will be referred to as a bus current IDC hereinafter. The current sensor 18 is operative to output, to the controller 20, the measured value of the bus current IDC flowing through the negative bus Ln.

For example, the current sensor 18 is comprised of a shunt resistor 18a and a potential difference detector 18b. The shunt resistor 18a is connected to the negative bus Ln, and the potential difference detector 18b is operative to measure the potential difference across the shunt resistor 18a. The potential difference detector 18b is communicable with the controller 20, and output the measured potential difference to the controller 20.

The controller 20 is connected to the gate, i.e. the control terminal, of each of the switching elements S#&, and to a request torque input unit 36 for inputting, to the controller 20, a request torque Trq* for the motor 10.

Specifically, the controller 20 is designed to receive the measured values output from the sensors 14, 16, and 18, and the request torque Trq*. Then, the controller 20 is designed to generate, based on the received pieces of data set forth above, drive signals g#& for individually driving the respective switching elements S#&, and supply the drive signals g#& to the gates of the respective switching elements S#&. This individually turns on or off the respective switching elements S#&, thus converting the inverter input voltage VDC into an AC voltage, and supplying the AC voltage to the motor 10 while controlling at least one controlled variable, such as output torque or the rotational speed, of the motor 10.

Each of the drive signals g#&; has a predetermined duty cycle, i.e. a controllable on-pulse width for each cycle, in other words, a predetermined ratio, i.e. percentage, of on duration to the total duration of each switching cycle for a corresponding one of the switching elements S#&.

Next, an example of the circuit structure of the controller 20 will be described with reference to FIG. 1.

The controller 20 is designed as, for example, a computer circuit consisting essentially of, for example, a CPU and a nonvolatile memory.

As illustrated in FIG. 1, the controller 20 includes a command current setter 22, a command voltage setter 24, an angular velocity calculator 26, a drive signal generator 28, first, second, third, and fourth absolute-value calculators 30, 32, 34, and 50, and a selector 52. The controller 20 also includes first, second, and third deviation calculators 40, 42, and 44; first, second, and third feedback manipulated-variable calculators 60, 62, and 64; first, second, and third adders 70, 72, and 74; first, second, and third multipliers 80, 82, and 84; and a modulation selector 90. The first, second, third, and fourth absolute-value calculators 30, 32, 34, and 50 are simply expressed as "abs" in FIG. 1, and the manipulated-variable calculators 60, 62, and 64 are also simply expressed as "PI" in FIG. 1.

The command current setter 22 is operative to receive the request torque Trq* input from the request torque input unit 36, and set three-phase command currents iu*, iv*, and iw* that are required to adjust the output torque of the motor 10 to the request torque Trq*. The three-phase command currents iu*, iv*, and iw* are sinusoidal signals having a phase shift of 2π/3 radian, i.e. 120°, therebetween.

The angular velocity calculator 26 is operative to receive the rotational angle θ of the motor 10, and calculate an electric angular velocity ω corresponding to the rotational angle θ.

The command voltage setter 24 is operative to receive the three-phase command currents iu*, iv*, and iw* output from the command current setter 22, and the angular velocity ω output from the angular velocity calculator 26. The command voltage setter 24 is also operative to set, based on the three-phase command currents iu*, iv*, and iw* and the angular velocity ω, three-phase command voltages Vu*, Vv*, and Vw* as feedforward controlled variables. The three-phase command voltages Vu*, Vv*, and Vw*, which are, for example, sinusoidal signals, respectively, are required to adjust three-phase currents flowing in the motor 10 to the three-phase command currents iu*, iv*, and iw*, respectively.

For example, the command voltage setter 24 according to the first embodiment is operative to set the three-phase command voltages Vu*, Vv*, and Vw* using the following voltage equation [EQ 1]:

$$\begin{bmatrix} Vu^* \\ Vv^* \\ Vw^* \end{bmatrix} = \begin{bmatrix} R+pL & 0 & 0 \\ 0 & R+pL & 0 \\ 0 & 0 & R+pL \end{bmatrix} \begin{bmatrix} iu^* \\ iv^* \\ iw^* \end{bmatrix} + \begin{bmatrix} \omega\phi\sin\theta \\ \omega\phi\sin\left(\theta - \frac{2}{3}\pi\right) \\ \omega\phi\sin\left(\theta - \frac{4}{3}\pi\right) \end{bmatrix} \quad [EQ\ 1]$$

where R represents the resistance of each-phase armature winding, L represents the inductance of each-phase armature winding, p represents a differential operator, and φ represents the maximum value of permanent-magnet flux linkage to each-phase armature winding.

That is, the combination of the command current setter 22 and the command voltage setter 24 serve as a command voltage setter for setting the three-phase command voltages V#*.

The controller 20 according to the first embodiment is configured to basically perform the feedforward control to generate the three-phase command voltages Vu*, Vv*, and Vw*, and generate, by the drive signal generator 28, the drive signals g#* for individually driving the respective switching elements S#&, thus controlling the output torque of the motor 10.

In addition to the configuration, the controller 20 according to the first embodiment is specially configured to perform an amplitude correction task on the three-phase command voltages Vu*, Vv*, and Vw* for reduction of ripples in the output torque of the motor 10.

The amplitude correction task is designed to reduce the deviations of the actual amplitudes of respective three-phase currents iu, iv, and iw flowing in the motor 10 from predicted amplitudes of them. Note that the predicted amplitude of a phase current, i.e. a one-phase current, represents the amplitude of the phase current obtained by the feedforward control set forth above as a theoretical phase current if values of the resistance R of each-phase armature winding, the inductance L of each-phase armature winding, and the maximum value φ of permanent-magnet flux linkage to each-phase armature winding retains corresponding designed values.

Figures 2, 3:
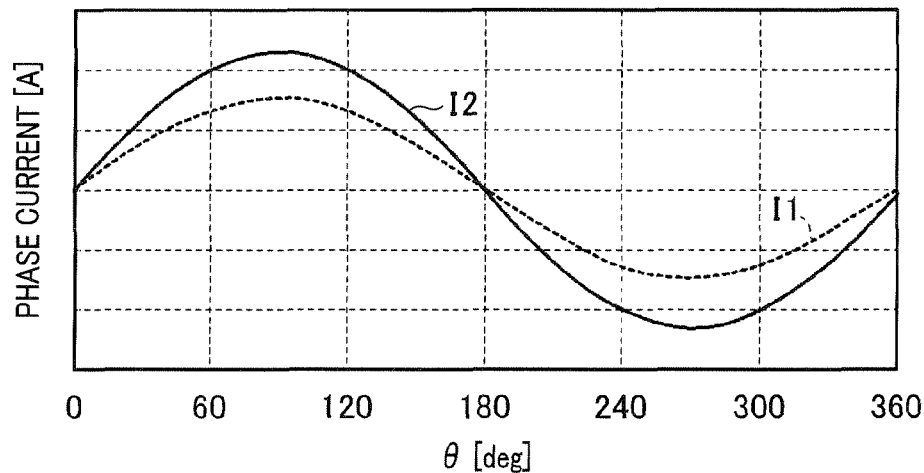
FIG. 2 is a graph schematically illustrating an example of deviation between a theoretical phase current having a predicted amplitude and a corresponding actual phase current having an actual amplitude according to the first embodiment.
FIG. 3 is a view schematically illustrating a map including information representing that which of three-phase currents flows through a negative bus as a bus current for each of output voltage vectors of an inverter according to the first embodiment.

FIG. 2 schematically illustrates an example of deviation between a theoretical phase current I1 having a predicted amplitude and a corresponding actual phase current I2 having an actual amplitude. The vertical axis of FIG. 2 represents the magnitude of each of the currents I1 and I2, and the horizontal axis represents the rotational angle θ of the motor 10. This deviation may occur due to, for example, the variation in the desired value of the resistance R of at least an armature winding for a phase caused by the variation in temperature of the armature, i.e. the stator, of the motor 10.

Next, the amplitude correction task will be described hereinafter with reference to FIG. 1.

The first absolute-value calculator 30 is operative to calculate the absolute value of the U-phase command current iu*, and input the absolute value of the U-phase command current iu* to the first deviation calculator 60. Similarly, the second absolute-value calculator 32 is operative to calculate the absolute value of the V-phase command current iv*, and input the absolute value of the V-phase command current iv* to the second deviation calculator 62. In addition, the third absolute-value calculator 34 is operative to calculate the absolute value of the W-phase command current iw*, and input the absolute value of the W-phase command current iw* to the third deviation calculator 64.

On the other hand, the value of the bus current IDC measured by the current sensor 18 is input to the fourth absolute-value calculator 50. The fourth absolute-value calculator 50 converts the measured value of the bus current IDC into the absolute value of the bus current IDC. The fourth absolute-value calculator 50 outputs the absolute value of the bus current IDC to the selector 52, so that the absolute value of the bus current IDC is input to the selector 52. The current sensor 18 and the fourth absolute value calculator 50 serve as, for example, a measuring module.

The selector 52, serving as an identifying module, is operative to receive voltage-vector information, which is output thereto from the drive signal generator 28.

The voltage-vector information specifies the operating state of the inverter INV. Specifically, the inverter INV operates in a selected one of a plurality of switching modes, i.e. on-off modes, of the respective switching elements S#&. The plurality of switching modes, i.e. drive modes, of the inverter INV are defined as voltage vectors Vi that define the plurality of switching modes in which the inverter INV.

Specifically, as illustrated in FIG. 3, voltage vector V0 represents that all the switching elements Sun, Svn, and Swn are in an on state, in other words, the remaining switching elements Sup, Svp, and Swp are in an off state. Voltage vector V1 represents that the switching elements Sup, Svn, and Swn are in the on state, in other words, the remaining switching elements Sun, Svp, and Swp are in the off state. Voltage vector V7 represents that all the switching elements Sup, Svp, and Swp are in the on state, in other words, the remaining switching elements Sun, Svn, and Swn are in the off state. For the other voltage vectors V2 to V6, please refer to FIG. 3.

The voltage vectors V0 and V7 express that all of the three-phase windings are short-circuited so that line-to-line voltages between the three-phase windings of the motor-generator 10 are all zero. Thus, the voltage vectors V0 and V7 will be referred to as zero voltage vectors hereinafter.

In contrast, each of the remaining voltage vectors V1 to V6 express a switching mode in which at least one of the high-side switching elements and at least one of the low-side switching elements are ON, so that line-to-line voltages between the three-phase windings of the motor-generator 10 effectively appear. Thus, the voltage vectors V1 to V6 will be referred to as effective voltage vectors V1 to V6 hereinafter.

That is, the voltage-vector information represents one of the voltage vectors V0 to V7; the one of the voltage vectors V0 to V7 specifies a corresponding one of the plurality of switching modes, i.e. on-off modes, of the respective switching elements S#& in which the inverter INV is operating.

Based on the voltage-vector information sent from the drive signal generator 28, the selector 52 selectively outputs the absolute value of the bus current IDC to any one of the first to third deviation calculators 40, 42, and 44.

For example, the selector 52 stores therein a map M in data-table format, in mathematical expression format, and/or program format. As illustrated in FIG. 3, the map M includes information representing that which of three-phase currents i# flows through the negative bus line Ln as the bus current IDC for each of the voltage vectors V1 to V6. For example, for the voltage vector V1 in which the switching elements Sup, Svn, and Swn are in the on state, a U-phase current iu flows through the switching element Sup and the U-phase armature winding (see phantom arrow Ar1 in FIG. 1), so that a V-phase current iv and a W-phase current iw) flow through the respective V- and W-phase armature windings and the respective switching elements Svn and Swn (see phantom arrows Art and Ar3 in FIG. 1). This results in the U-phase current iu (see phantom arrow Ar4 in FIG. 1) flowing through the negative bus line Ln as the bus current IDC because the sum of the V- and W-phase currents iv and iw is equal to the U-phase current iu. For the voltage vector V5 in which the switching elements Sun, Svn, and Swp are in the on state, the W-phase current iw flows through the negative bus line Ln as the bus current IDC.

Specifically, the selector 52 references the map M using the currently selected voltage vector corresponding to the currently selected switching mode of the inverter INV, which is included in the voltage-vector information as a key. Then, the selector 52 identifies the absolute value of the bus current IDC as the absolute value of any one of the three-phase currents iu, iv, and iw based on the results of the reference. On the basis of the results of the identification, the selector 52 selectively outputs the absolute value of the bus current IDC to identified one of the first to third deviation calculators 40, 42, and 44.

Note that, in the map M illustrated in FIG. 3, the sign of each of the three-phase currents i# is defined such that, if a corresponding phase current i# flows from the motor 10 toward the inverter INV, the sign of the corresponding phase current i# is positive. Thus, if a corresponding phase current i# flows from the inverter INV toward the motor 10, the sign of the corresponding phase current i# is negative.

The first deviation calculator 40 is operative to subtract the absolute value of the bus current IDC from the absolute value of the U-phase command current iu* if the first deviation calculator 40 is selected by the selector 52. The subtraction obtains the deviation in amplitude between the U-phase command current iu* and the U-phase current iu. The first deviation calculator 40 is also operative to output the deviation, i.e. the U-phase amplitude deviation, to the first manipulated-variable calculator 60.

Similarly, the second deviation calculator 42 is operative to subtract the absolute value of the bus current IDC from the absolute value of the V-phase command current iv* if the second deviation calculator 42 is selected by the selector 52. The subtraction obtains the deviation in amplitude between the V-phase command current iv* and the V-phase current iv. The second deviation calculator 42 is also operative to output the deviation, i.e. the V-phase amplitude deviation, to the second feedback manipulated-variable calculator 62.

In addition, the third deviation calculator 44 is operative to subtract the absolute value of the bus current IDC from the absolute value of the W-phase command current iw* if the third deviation calculator 44 is selected by the selector 52. The subtraction obtains the deviation in amplitude between the W-phase command current iw* and the W-phase current iw. The third deviation calculator 44 is also operative to output the deviation, i.e. the W-phase amplitude deviation, to the third feedback manipulated-variable calculator 64.

That is, the combination of the first to third deviation calculators 40, 42, and 44 serves as, for example, a deviation calculating module. The deviation calculating module is configured to calculate the deviation between the absolute value of each of the three-phase currents i#* and the absolute value of a corresponding one of the three-phase command currents i#*.

The first manipulated-variable calculator 60 is operative to receive the U-phase amplitude deviation output from the first deviation calculator 40, and calculate a manipulated variable for the U-phase command voltage Vu*, which aims to reduce the U-phase amplitude deviation to, for example, zero.

Similarly, the second feedback manipulated-variable calculator 62 is operative to receive the V-phase amplitude deviation output from the second deviation calculator 42, and calculate a manipulated variable for the V-phase command voltage Vv*, which aims to reduce the V-phase amplitude deviation to, for example, zero.

In addition, the third feedback manipulated-variable calculator 64 is operative to receive the W-phase amplitude deviation output from the third deviation calculator 44, and calculate a manipulated variable for the W-phase command voltage Vw*, which aims to reduce the W-phase amplitude deviation to, for example, zero.

Specifically, the first manipulated-variable calculator 60 calculates the manipulated variable using the sum of a proportional gain term and an integral gain term of a PI feedback control algorithm (PI algorithm) using the U-phase amplitude deviation as its input.

In the PI algorithm, the manipulated variable is expressed based on the proportional gain term and the integral gain term.

The proportional gain term for the manipulated variable contributes to change in the manipulated variable in proportion to the temporal deviations of the U-phase amplitude deviation from a target value of zero. The integral gain term is proportional to an accumulated offset of instantaneous values of the U-phase amplitude deviation over time to reset the accumulated offset (steady-state deviation) over time to zero.

For example, the manipulated variable MV is expressed by the following equation [EQ2]:

$$MV = Kp \cdot \Delta Du + \Sigma Ki \cdot \Delta Du \qquad [EQ2]$$

where Kp represents a proportional constant, i.e. a proportional gain, ΔDu represents the U-phase amplitude deviation, and Ki represents an integral constant, i.e. an integral gain.

The first adder 70 is operative to add 1 to the value of the manipulated variable output from the first feedback manipulated-variable calculator 60, and output the result of the addition to the first multiplier 80 as a U-phase amplitude correction coefficient for correcting the U-phase command voltage Vu*. That is, if the polarity of the value of the manipulated variable is positive, the U-phase amplitude correction coefficient is 1.x; x corresponds to the value of the manipulated variable. Otherwise, if the polarity of the value of the manipulated variable is negative, the U-phase amplitude correction coefficient is 0.x; x corresponds to the value of the manipulated variable.

The first multiplier 80 is operative to multiply the U-phase command voltage Vu* output from the command voltage setter 24 by the U-phase amplitude correction coefficient output from the first adder 70, thus obtaining a corrected U-phase command voltage Vu*a. Then, the first multiplier 80 outputs the corrected U-phase command voltage Vua* to the modulation selector 90.

Similarly, the second adder 72 is operative to add 1 to the value of the manipulated variable output from the second feedback manipulated-variable calculator 62, and output the result of the addition to the second multiplier 82 as a V-phase amplitude correction coefficient for correcting the V-phase command voltage Vv*. The second multiplier 82 is operative to multiply the V-phase command voltage Vv* output from the command voltage setter 24 by the V-phase amplitude correction coefficient output from the second adder 72, thus obtaining a corrected V-phase command voltage Vv*a. Then, the second multiplier 82 outputs the corrected V-phase command voltage Vv*a to the modulation selector 90.

In addition, the third adder 74 is operative to add 1 to the value of the manipulated variable output from the third feedback manipulated-variable calculator 64, and output the result of the addition to the third multiplier 84 as a W-phase amplitude correction coefficient for correcting the W-phase command voltage Vw*. The third multiplier 84 is operative to multiply the W-phase command voltage Vw* output from the command voltage setter 24 by the W-phase amplitude correction coefficient output from the third adder 74, thus obtaining a corrected W-phase command voltage Vw*a. Then, the third multiplier 84 outputs the corrected W-phase command voltage Vw*a to the modulation selector 90.

That is, the combination of the first to third absolute-value calculators 30, 32, and 34, the first to third deviation calculators 40, 42, and 44, the first to third feedback manipulated-variable calculators 60, 62, and 64, the first to third adders 70, 72, and 74, and the first to third multipliers 80, 82, and 84 serves as, for example, an amplitude corrector for correcting the amplitude of at least one of the three-phase command voltages V#*.

The modulation selector 90 serves as, for example, a two-phase modulation module. Specifically, the modulation selector 90 is operative to select a three-phase PWM task or a two-phase PWM task. If selecting the three-phase PWM task, the modulation selector 90 performs three-phase modulation that sends the corrected three-phase command voltages Vu*a, Vv*a, and Vw*a to the drive signal generator 28 as they are, which serves to send an instruction to perform the three-phase PWM task. Otherwise, if selecting the two-phase PWM task, the modulation selector 90 performs two-phase modulation on the corrected three-phase command voltages Vu*a, Vv*a, and Vw*a to generate two-phase modulated duty signals Du*a, Dv*a, and Dw*a. Thereafter, the modulation selector 90 sends the two-phase modulated duty signals Du*a, Dv*a, and Dw*a to the drive signal generator 28 as an instruction to perform the two-phase PWM task.

The drive signal generator 28, serving as an on-off performing module, is comprised of a triangular-carrier output unit 28a for outputting a cyclic triangular carrier signal CS having an amplitude of 1, and is operative to perform, using the triangular carrier signal CA, the three-phase PWM task or the two-phase PWM task according to whether the instruction to perform the three-phase PWM task is sent from the modulation selector 90 or the instruction to perform the two-phase PWM task is sent therefrom.

When the modulation selector 90 selects the three-phase PWM task so that the instruction to perform the three-phase PWM task is sent from the modulation selector 90 to the drive signal generator 28, the drive signal generator 28 performs the three-phase PWM task as follows.

Specifically, the drive signal generator 28 divides the corrected three-phase command voltages Vu*a, Vv*a, and Vw*a by the half of the inverter input voltage VDC to thereby generate normalized command duty signals, i.e. command three-phase modulation signals, Du*, Dv*, and Dw*, respectively.

Figure 4A:
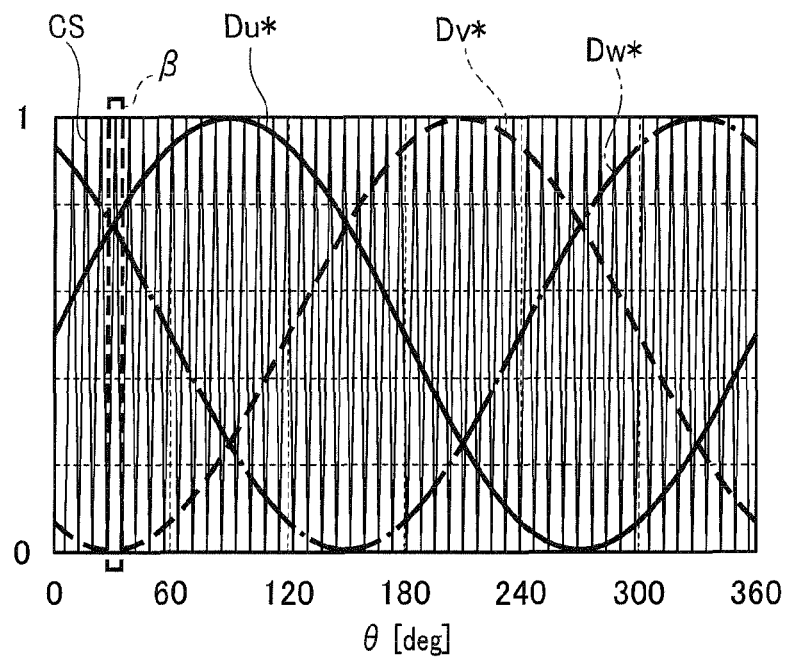
FIG. 4A is a graph schematically illustrating the waveforms of respective command duty signals and a waveform of a triangular carrier signal according to the first embodiment.

As illustrated in FIG. 4A, if the corrected three-phase command voltages Vu*a, Vv*a, and Vw*a, which are sinusoidal signals, have a same amplitude of VDC/2, the command duty signals Du*, Dv*, and Dw* are sinusoidal signals having a same amplitude of 1 and a phase shift of $2\pi/3$ radian, i.e. 120°, therebetween. The command duty signals Du*, Dv*, and Dw* are used for comparison with the cyclic triangular carrier signal CS having an amplitude of 1 matching the amplitude of each duty signal, and a cycle T identical to a switching cycle of each of the switching elements S#&. The cycle T of the triangular carrier signal CS will be referred to as a PWM cycle T hereinafter.

Specifically, the drive signal generator 28 is operative compare in magnitude the command duty signals Du*, Dv*, and Dw* with the triangular carrier signal CS (see FIG. 4A), thus obtaining a value of the duty cycle of each of the switching elements S#&.

For example, during one PWM cycle T, the period for which a value of the command duty signal Du* is equal to or higher than the triangular carrier signal CS is an on duration of the drive signal gup for the switching element Sup, and the period for which a value of the command duty signal Du* is lower than the triangular carrier signal CS is an off duration of the drive signal gup for the switching element Sup. The duty cycle for the switching element Sup during the PWM cycle T can be determined based on the ratio of the on duration to the sum of the on duration and the off duration.

That is, during one PWM cycle T, if the period for which a value of the command duty signal Du* is equal to the positive peak 1 of the triangular carrier signal CS, a value of the duty cycle is 100%. Otherwise, during one PWM cycle T, if a value of the command duty signal Du* becomes the negative peak −1 of the triangular carrier signal CS, a value of the duty cycle is 0%.

Specifically, each of the command duty signals D#* is set within the range from 0 meaning the duty cycle of 0% to 1 meaning the duty cycle of 100% inclusive.

The aforementioned comparison in magnitude between the command duty signals Du*, Dv*, and Du)* and the triangular carrier signal CS for each PWM cycle T generates PWM signals g# for the respective switching elements S#&; each of the PWM signals g# has a determined duty cycle for each PWM cycle T. Signals for turning on high-side switching elements in the PWM signals g# will be referred to as high-side turn-on signals, and signals for turning on low-side switching elements in the PWM signals g# will be referred to as low-side turn-on signals. Similarly, signals for turning off high-side switching elements in the PWM signals g# will be referred to as high-side turn-off signals, and signals for turning off low-side switching elements in the PWM signals g# will be referred to as low-side turn-off signals.

In addition, the drive signal generator 28 is operative to delay the rising edge of each of the high-side turn-on signals by a dead time DT, thus generating a corresponding one of high-side turn-on signals g#p. Similarly, the drive signal generator 28 is operative to delay the rising edge of each of the low-side turn-on signals by, for example, the same dead time DT, thus generating a corresponding one of low-side turn-on signals g#n (see FIG. 1).

In the first embodiment, for generation of the high-side and low-side turn-on signals g#p and g#n, the dead time, i.e. the time delay, between each of the high-side turn-on signals g#p and a corresponding one of the low-side turn-on signals g#n is introduced to prevent a short circuit in the DC link.

On the other hand, when the modulation selector 90 selects the two-phase PWM task so that the instruction to perform the two-phase PWM task is sent from the modulation selector 90 to the drive signal generator 28, the drive signal generator 28 performs the two-phase PWM task to generate the two-phase modulated duty signals Du*a, Dv*a, and Dw*a set forth above.

An example of how the modulation selector 90 performs the two-phase modulation on the duty signals Du*a, Dv*a, and Dw*a to generate the two-phase modulated duty signals Du*a, Dv*a, and Dw*a will be described hereinafter with reference to FIGS. 4A and 4B.

Figure 4B:
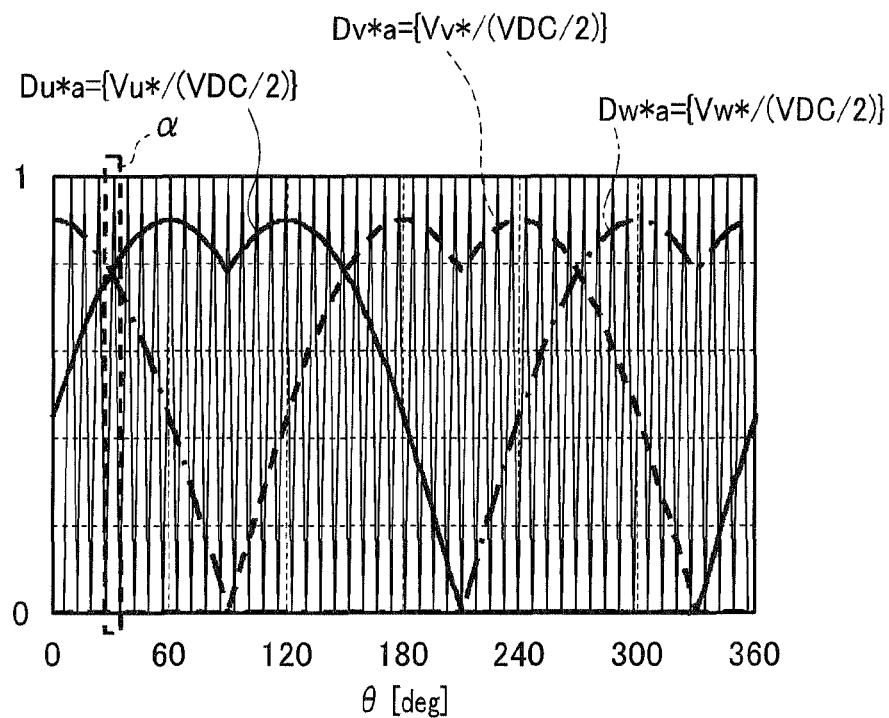
FIG. 4B is a graph schematically illustrating the waveforms of two-phase modulated duty signals and the waveform of the triangular carrier signal according to the first embodiment.

Like the three-phase PWM task, the modulation selector 90 generates the normalized three-phase duty signals Du*, Dv*, and Dw* illustrated in FIG. 4A. Then, the modulation selector 90 generates, based on the normalized three-phase duty signals Du*, Dv*, and Dw*, the two-phase modulated duty signals Du*a, Dv*a, and Dw*a. The two-phase modulated duty signals Du*a, Dv*a, and Dw*a are configured such that:

they are successively fixed to be zero (0%) in order for each 120° electric angle of rotation of the motor 10 while maintaining each in-line voltage based on the duty signals Du*a, Dv*a, and Dw*a having a substantially sinusoidal waveform (see FIG. 4B).

Specifically, during 120° electrical angle of rotation of the motor 10, the duty signal Du*a is fixed to be zero. During next 120° electrical angle of rotation of the motor 10, the duty signal Dv*a is fixed to be zero. During next 120° electrical angle of rotation of the motor 10, the duty signal Dw*a is fixed to be zero. Thereafter, these operations are repeated.

In other words, the two-phase modulated duty signals Du*a, Dv*a, and Dw*a cause the high-side switching element and low-side switching element of one selected phase to be respectively maintained off and on for each 120° electric angle of rotation of the motor 10 while changing the selection of the phase to another phase in order.

More specifically, as illustrated in FIG. 4A, the modulation selector 90 subtracts the minimum value, i.e. 0, of the duty signals Du*, Dv*, and Dw* from values of the minimum one of the duty signals Du*, Dv*, and Dw*, thus obtaining offset values of the minimum one of the duty signals Du*, Dv*, and Dw*. Then, the modulation selector 90 subtracts, from values of all the duty signals Du*, Dv*, and Dw*, the offset values, thus changing the values of the minimum one of the duty signals Du*, Dv*, and Dw* to the minimum value, i.e. 0. These operations obtain the two-phase modulated duty signals Du*a, Dv*a, and Dw*a illustrated in FIG. 4B.

Note that, in the first embodiment, the modulation selector 90 is designed to perform the two-phase modulation set forth above.

After the generation of the two-phase modulated duty signals Du*a, Dv*a, and Dw*a, the drive signal generator 28 is operative to compare in magnitude between the triangular carrier signal CS and two of the two-phase modulated duty signals Du*a, Dv*a, and Dw*a except for the remaining duty signal that is fixed to the minimum value of 0 (see FIG. 4B) in the same approach as the three-phase PWM task set forth above. This obtains a value of the duty cycle of each of the switching elements S#&.

FIGS. 5A to 5F are a joint timing chart schematically illustrating an example of specific operations of the two-phase PWM task executed by the controller 20 at a part α of the graph illustrated in FIG. 4B corresponding to the rotational angle θ of 30° of the motor 10 or thereabout.

FIG. 5A schematically illustrates the part α of the graph illustrated in FIG. 4B while the part α is enlarged only in the horizontal axis representing the electric rotational angle of the motor 10, i.e. the scale of time. More specifically, FIG. 5A schematically illustrates how the two-phase modulated duty signals Du*a, Dv*a, and Dw*a and the triangular carrier signal CS vary during one PWM cycle T.

FIG. 5B schematically illustrates how the PWM signals g# vary during the same PWM cycle T, and FIG. 5C schematically illustrates the output voltage vector Vi of the inverter INV. FIGS. 5D to 5F schematically illustrate how three-phase currents iu, iv, and iw flow in the motor 10. Note that, in FIG. 5B, illustration of dead times is omitted, the reference characters of switching elements, which are turned on, are illustrated to be close to the PWM signals g#. In addition, note that reference characters Iuave, Ivave, and Iwave represent the average values of the respective three-phase currents iu, iv, and iw over the same PWM cycle T.

Referring to FIG. 4B and FIGS. 5A to 5F, on the basis of the two-phase PWM task, the two-phase modulated duty signal Dv*a is fixed to zero, so that the high-side switching element Svp is fixed to be off and the low-side switching element Svn fixed to be on. While the two-phase modulated duty signal Dv*a is fixed to zero, comparison in magnitude between the two-phase modulated duty signals Du*a and Dw*a and the triangular carrier signal CS generates the PWM signals gu and gw for turning on or off the respective high- and low-side switching elements Sup and Sun and high- and low-side switching elements Swp and Swn.

For example, in section S1, the triangular carrier signal CS is higher in level than the duty signals Du*a and Dw*a. Thus, the low-side turn-on signals gun and gwn are output to the respective low-side switching elements Sun and Swn, so that the low-side switching elements Sun and Swn are on while the high-side switching elements Sup and Swp are kept off. That is, all low-side switching elements S#n are on while all the high-side switching elements S#n are off, resulting in the output voltage vector Vi becoming the zero voltage vector V0 (see FIG. 3).

In section S2 corresponding to the present PWM cycle T, each of the duty signals Du*a and Dw*a is higher in level than the triangular carrier signal CS. The high-side turn-on signals gup and gwp are output to the respective high-side switching elements Sup and Swp, so that the high-side switching elements Sup and Swp are on while the high-side switching element Svp is kept off. That is, the high-side switching elements Sup and Swp are on while the high-side switching element Svn is on, resulting in the output voltage vector Vi becoming the effective voltage vector V6 (see FIG. 3).

Figure 6A:
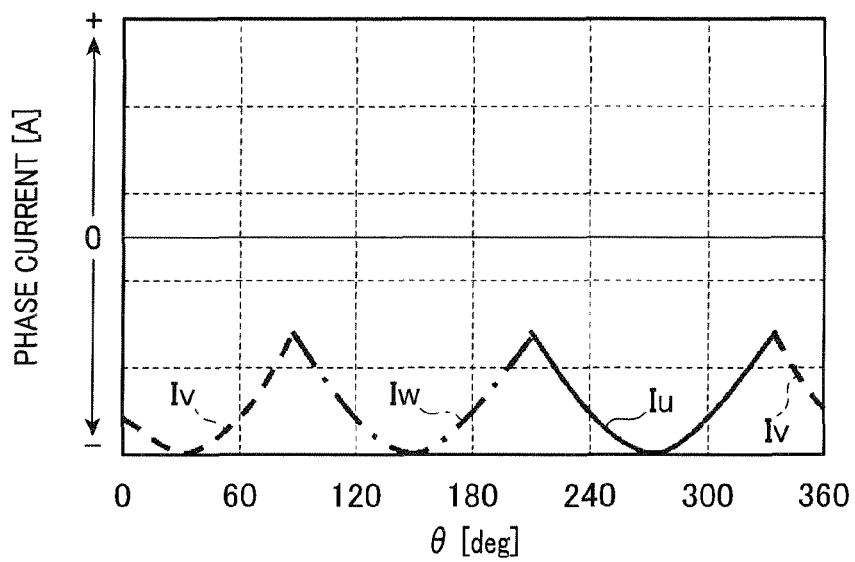
FIG. 6A is a graph schematically illustrating how the bus current varies according to the first embodiment.

As illustrated in FIG. 3, during the present PWM cycle T, the V-phase current iv is flowing through the negative bus Ln as the bus current IDC, so that it is possible for the current sensor 18 to measure a value of the bus current IDC as a value of the V-phase current iv. As illustrated in FIG. 6A, because the two-phase modulated duty signal Dv*a is fixed to zero during 120° electric angle of rotation of the motor 10, it is possible for the current sensor 18 to measure a value of the V-phase current iv during 120° electric angle of rotation of the motor 10 (see the angular period up to 90° of the rotation angle θ of the motor 10 in FIG. 6A). Similarly, during the next 120° electric angle of rotation of the motor 10 (see the angular period from 90° to 210° of the rotation angle θ of the motor 10 in FIG. 6A), because the two-phase modulated duty signal Dw*a is fixed to zero (see FIG. 4B), it is possible for the current sensor 18 to measure a value of the W-phase current iw.

In the first embodiment, as illustrated in FIGS. 5A to 5C, the two-phase PWM task makes it possible to generate the duration of the output voltage vector V6 of the inverter INV having its center that matches a local minimum peak, i.e. a trough, of the triangular carrier signal CS. Specifically, during the present PWM cycle T, the period from t1 to t3 illustrated in FIGS. 5A to 5F matches the duration of the output voltage vector V6 of the inverter INV. Thus, the current sensor 18 is allowed to measure a value of the bus current IDC as a value of the V-phase current iv within the period from the time t1 to the time t3 for the present PWM cycle T.

On this point, the current sensor 18 according to the first embodiment is configured to measure a value of the V-phase current iv at time t2 within the period from the time t1 to the time t3; the time t2 matches a local minimum peak, i.e. a trough, of the triangular carrier signal CS during the present PWM cycle T. As illustrated in FIGS. 5D to 5F, because the center of the present PWM cycle T matches a local minimum peak, i.e. a trough, of the triangular carrier signal CS, the average value of each phase current matches a value of a corresponding phase current at the time t2.

Figure 6B:
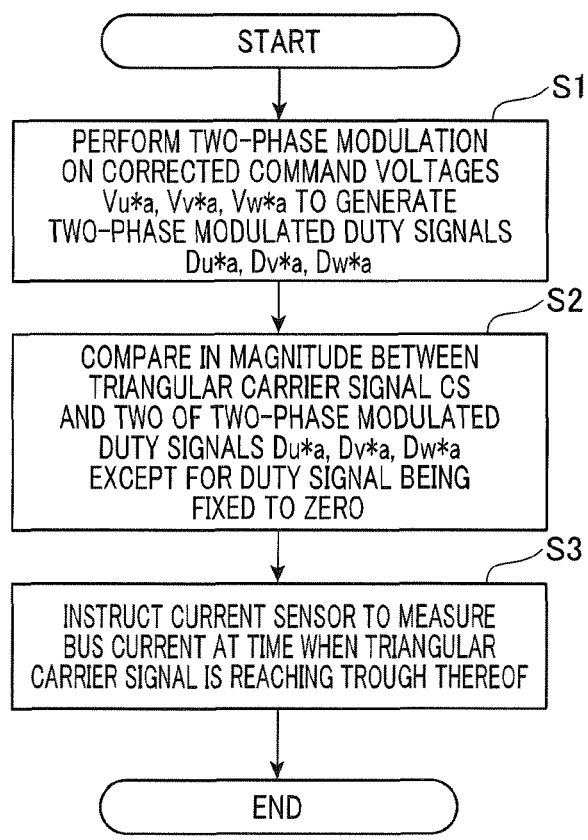
FIG. 6B is a flowchart schematically illustrating an example of important steps of the two-phase PWM task and a task of determining a timing to measure a value of the bus current as a phase current for each PWM cycle according to the first embodiment.

FIG. 6B schematically illustrates an example of important steps of the two-phase PWM task and a task of determining a timing to measure a value of the bus current IDC as a phase current for each PWM cycle. The routine of these steps illustrated in FIG. 6B is continuously executed each time the corrected three-phase command voltages Vu*a, Vv*a, and Vw*a are generated.

In step S1, the controller 20 performs the two-phase modulation on the corrected three-phase command voltages Vu*a, Vv*a, and Vw*a to generate two-phase modulated duty signals Du*a, Dv*a, and Dw*a, thus selecting the two-phase PWM task.

Next, the controller 20 compares in magnitude the triangular carrier signal CS and two of the two-phase modulated duty signals Du*a, Dv*a, and Dw*a except for the remaining duty signal that is fixed to the minimum value of 0 in step S2. This obtains a value of the duty cycle of each of the switching elements S#&.

While performing the operations in steps S1 and S2, the controller 20 instructs the current sensor 18 to measure a value of the bus current IDC as a phase current in synchronization with the occurrence of each local minimum peak, i.e. trough, of the triangular carrier signal CS in step S3.

As described above, because the controller 20 performs the two-phase PWM task for each PWM cycle T, the controller 20 requires the average value of a phase current for each PWM cycle T. In the example illustrated in FIGS. 5A to 5F, the controller 20 easily obtains the average value Ivave of the V-phase current iv during the present PWM cycle T.

That is, the controller 20 easily obtains the average value of a phase current for each PWM cycle T; the low-side switching element corresponding to the phase current is fixed to be on while the high-side switching element of the same phase is fixed to be off.

In FIG. 1, the triangular carrier signal CS is configured to be sent from the drive signal generator 28 to the selector 52, so that the selector 52 sends a control signal to the current sensor 18 in synchronization with the occurrence of each local minimum peak, i.e. trough, of the triangular carrier signal CS. This makes it possible for the current sensor 18 to measure a value of a phase current in response to when a control signal is input from the selector 52 to the current sensor 18. As another example, the current sensor 18 is designed to continuously measure, i.e. monitor, the bus current IDC, and the selector 52 is configured to selectively output the absolute value of the bus current IDC to one of the first to third deviation calculators 40, 42, and 44 in synchronization with the occurrence of each local minimum peak, i.e. trough, of the triangular carrier signal CS.

Specifically, the amplitude correction task according to the first embodiment is performed for each PWM cycle T based on a value of the bus current IDC measured at the timing of a local minimum peak, i.e. a trough, of the triangular carrier signal CS.

Figure 7A:
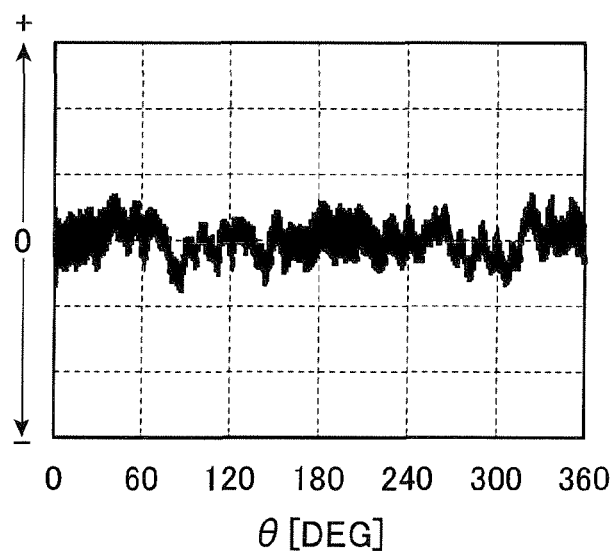
FIG. 7A is a graph schematically illustrating variation of the gap between a theoretical phase current and a corresponding actual phase current achieved in the control system according to the first embodiment while the amplitude of the actual phase current has been corrected based on an amplitude correction task according to the first embodiment.

Next, technical effects achieved by the control system 100 according to the first embodiment set forth above will be described hereinafter with reference to FIGS. 7A and 7B. Specifically, FIG. 7A schematically illustrates variation of the gap between a designed phase current and a corresponding actual phase current achieved in the control system 100 while the amplitude of the actual phase current has been corrected based on the amplitude correction task according to the first embodiment. In contrast, FIG. 7B schematically illustrates variation of the gap between the designed phase current and a corresponding actual phase current achieved in the control system 100 with no correction of the amplitude of the actual phase current.

Figure 7B:
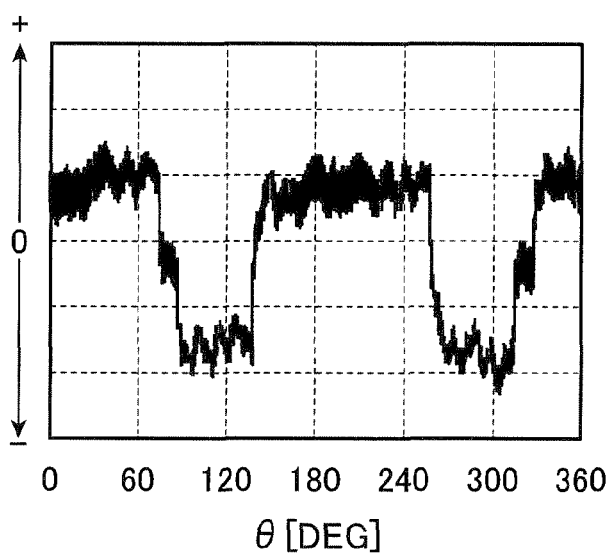
FIG. 7B schematically illustrates variation of the gap between the theoretical phase current and a corresponding actual phase current achieved in the control system with no correction of the amplitude of the actual phase current.

As easily seen by comparison between the graphs illustrated in FIGS. 7A and 7B, the amplitude correction task according to the first embodiment makes it possible to reduce variation of the gap between a designed phase current and a corresponding actual phase current achieved in the control system 100. This brings the amplitude of each of the actual three-phase currents iu, iv, and iw close to that of a designed corresponding phase current as much as possible, reducing ripples in the output torque of the motor 10.

As a first comparative example, let us consider that the drive signal generator 28 performs the three-phase PWM task.

FIGS. 8A to 8F are a joint timing chart schematically illustrating an example of specific operations of the three-phase PWM task executed by the controller 20 at a part β of the graph illustrated in FIG. 4A corresponding to the rotational angle θ of 30° of the motor 10 or thereabout.

FIG. 8A schematically illustrates the part β of the graph illustrated in FIG. 4A while the part β is enlarged only in the horizontal axis representing the electric rotational angle of the motor 10, i.e. the scale of time. More specifically, FIG. 8A schematically illustrates how the duty signals Du*, Dv*, and Dw* and the triangular carrier signal CS vary during one PWM cycle T. FIGS. 8B to 8F respectively correspond to FIGS. 5B to 5F.

In the first comparative example, referring to FIG. 4A and FIGS. 8A to 8F, on the basis of the three-phase PWM task, comparison in magnitude between the duty signals Du*, Dv*, and Dw* and the triangular carrier signal CS generates the PWM signals gu, gv, and gw for turning on or off the respective high- and low-side switching elements Sup and Sun, high- and low-side switching elements Svp and Svn, and high- and low-side switching elements Swp and Sum.

As seen by comparison between FIG. 8C and FIG. 5C, the period during which the output voltage vector of the inverter INV is the zero voltage vector V0 or V7 in the present PWM cycle T in the first comparative example is longer than that when the output voltage vector of the inverter INV is set to the zero voltage vector V0 or V7 in the present PWM cycle T in the first embodiment. The period during which the output voltage vector of the inverter INV is the zero voltage vector V0 or V7 in the present PWM cycle T includes a timing matching a local minimum peak, i.e. a trough, of the triangle carrier signal CS.

Specifically, in FIG. 8C, in section S11 before t11, the output voltage vector of the inverter INV is set to the zero voltage vector V7, in section S12 between time t13 and t14, the output voltage vector of the inverter INV is set to the zero voltage vector V0, and, in section S13 after time t15, the output voltage vector of the inverter INV is set to the zero voltage vector V7.

However, in the period for which the output voltage vector of the inverter INV is set to the voltage vector V0 or V7, it is difficult to measure a value of the bus current IDC as a value of a phase current. This is because no current is flowing through the negative bus Ln in the period for which the output voltage vector of the inverter INV is set to the voltage vector V0 or V7.

On this point, as illustrated in FIG. 8C, it is possible to measure a value of the bus current IDC as a value of the U-phase current iu at time t12 during the duration of the effective voltage vector V1 being set to the output voltage vector of the inverter INV; an average value of the U-phase current iu over the same PWM cycle T matches a value of the U-phase current iu at the time t12. However, it is difficult to determine when a value of the U-phase current iu during the duration of the output voltage vector V1 of the inverter INV reaches the average value of the U-phase current iu over the same PWM cycle T. In addition, a timing when a value of the bus current IDC corresponding to a phase current flowing through the negative bus Ln reaches an average value of the phase current over one PWM cycle T may vary depending on what a corresponding output voltage vector of the inverter INV is set to. For this reason, it is necessary to change a timing to measure a value of the bus current IDC flowing through the negative bus Ln as a value of a phase current for each PWM cycle T depending on what a corresponding output voltage vector of the inverter INV is set to. This may cause a heavy processing load on the controller 20.

In contrast, as described above, the control system 100 according to the first embodiment is configured to fix a timing to measure a value of a phase current flowing through the negative bus IDC as the bus current IDC for each PWM cycle T to a timing when a local minimum peak, i.e. a trough, of the triangle carrier signal CS appears for a corresponding PWM cycle T. This therefore reduces a processing load on the controller 20.

As a second comparative example, let us consider the control system disclosed in Japanese Patent Publication No. 4983322.

As described above, ringing takes place in a bus current at the moment when a present operating state, i.e. an output voltage vector, of the inverter is being changed to another operating state, i.e. another output voltage vector. For example, the ringing takes place due to: wiring resistance of a closed circuit comprised of the DC power source, a positive bus connected between a positive DC input terminal of the inverter and a positive terminal of the DC power source, the inverter, and the negative bus, and parasitic inductance existing in the closed circuit, and resonance caused by parasitic capacitance of flywheel diodes of the inverter.

On that point, in the control system disclosed in the Patent Publication, because when a value of the bus current is measured is set independently of the operating state of the inverter, i.e. a current output voltage vector of the inverter, the measured value of the bus current may include noise due to the ringing, resulting in difficulty measuring a value of the bus current with high accuracy.

In contrast, as described above, the control system 100 according to the first embodiment performs the two-phase PWM task for each PWM cycle to generate the duration of an effective voltage vector of the inverter INV having its center at which a value of the bus current IDC can be measured as an average value of a corresponding phase current for a corresponding PWM cycle T.

As illustrated in FIG. 5C, the percentage of the period during which the effective voltage vector is set to the output voltage vector of the inverter INV within one PWM cycle T is greater than that of the period during which an effective voltage vector is set to the output voltage of the inverter in the control system disclosed in the Patent Publication.

Thus, it is possible to sufficiently ensure the period during which a value of the bus current IDC can be measured as a value of a phase current with little influence from ringing, thus increasing the accuracy of measuring a value of the bus current IDC as a value of a phase current.

As described above, the control system 100 according to the first embodiment is configured to:

perform the two-phase PWM task to fix the high-side switching element of one phase to be off with the low-side switching element of the same phase being fixed to be on for each PWM cycle T; and measure a value of the bus current IDC as a value of the corresponding phase current flowing through the negative bus Ln for a corresponding PWM cycle T at a timing matching a local minimum peak, i.e. a trough, of the triangular carrier signal CS during the PWM cycle T.

This configuration generates the duration of an effective voltage vector of the inverter INV having its center timing at which a value of the bus current IDC can be measured. Thus, it is possible to sufficiently ensure the period during which a value of the bus current IDC can be measured as a value of a phase current with little influence from ringing, resulting an increase of the accuracy of measuring a value of the bus current IDC as a value of a phase current.

In addition, this configuration easily fixes a timing to measure a value of the bus current IDC to a timing when a local peak of the triangular carrier signal CS occurs without using additional hardware components.

Note that it is known that, in the three-phase PWM task, the amplitude of each of the corrected three-phase command voltages Vu*a, Vv*a, and Vw*a is the half level of the inverter input voltage VDC, that is the amplitude of each of the three-phase duty signals Du*, Dv*, and Dw* is set to 1.

Thus, in the three-phase PWM task, a maximum line-to-line voltage as the output voltage of the inverter INV is set to $$\frac{\sqrt{3}}{2} \cdot \text{VDC}.$$

In contrast, in the two-phase PWM task, as illustrated in FIGS. 4A and 4B, the amplitude of each of the two-phase modulated duty signals Du*a, Dv*a, and Dw*a is lower than that of a corresponding one of the three-phase duty signals Du*, Dv*, and Dw*. For this reason, setting the amplitude of each of the two-phase modulated duty signals Du*a, Dv*a, and Dw*a to 1 permits a maximum line-to-line voltage as the output voltage of the inverter INV to be set to the inverter input voltage VDC. That is, the maximum line-to-line voltage obtained in the two-phase PWM task is equal to the product of $$\frac{2}{\sqrt{3}}$$

and the maximum line-to-line voltage obtained in the three-phase PWM task.

Thus, it is possible to improve the voltage utilization factor of the inverter INV according to the first embodiment, which represents the ratio of the magnitude of the inverter output voltage to the magnitude of a line-to-line voltage being input to the inverter INV, by substantially 15% in comparison to the voltage utilization factor of the inverter INV that uses the three-phase PWM task.

Additionally, the control system 100 according to the first embodiment is configured to perform the amplitude correction task. The amplitude correction task multiplies the three-phase command voltages Vu*, Vv*, and Vw* output from the command voltage setter 24 by the respective amplitude correction coefficients output from the first, second, and third adders 70, 72, and 74, thus obtaining corrected three-phase command voltages Vu*a, Vv*a, and Vu*a.

As a modification of the amplitude correction task according to the first embodiment, the controller 20 can be configured to perform a second amplitude correction task in place of the amplitude correction task set forth above. The second amplitude correction task is designed to quantify a correction value for each phase command voltage V#* based on the ratio of an output value of the fourth absolute-value calculator 50 to an output value of a corresponding one of the first to third absolute-value calculators 30 to 34. This modification can also correct the amplitudes of the respective three-phase command voltages V#* to reduce the variations in the amplitudes of the three-phase currents i#.

In this modification, because the three-phase currents i#& are alternating currents, if the denominator of the ratio is zero or close to zero, this may reduce the accuracy of calculating the correction value for each phase command voltage V#*. Thus, in this modification, the controller 20 can be configured to avoid calculation of the ratio of an output value of the fourth absolute-value calculator 50 to an output value of a corresponding one of the first to third absolute-value calculators 30 to 34 if the denominator of the ratio is zero or close to zero. This configuration of the controller 20 according to the modification may make the second amplitude correction task complicated.

In contrast, as described above, the amplitude correction task according to the first embodiment properly corrects the amplitudes of the respective three-phase command voltages v#* to reduce the variations in the amplitudes of the three-phase currents i# without making the amplitude correction task complicated.

Second Embodiment

A control system for the motor 10 according to a second embodiment of the present disclosure will be described with reference to FIGS. 9 to 11F.

The structure and/or functions of the control system according to the second embodiment are different from those of the control system 100 by the following points. So, the different points will be mainly described hereinafter.

In the control system according to the second embodiment, the modulation selector 90 is configured to perform another two-phase modulation on the duty signals Du*a, Dv*a, and Dw*a; this two-phase modulation according to the second embodiment will be referred to as a second two-phase modulation hereinafter.

Figure 9:
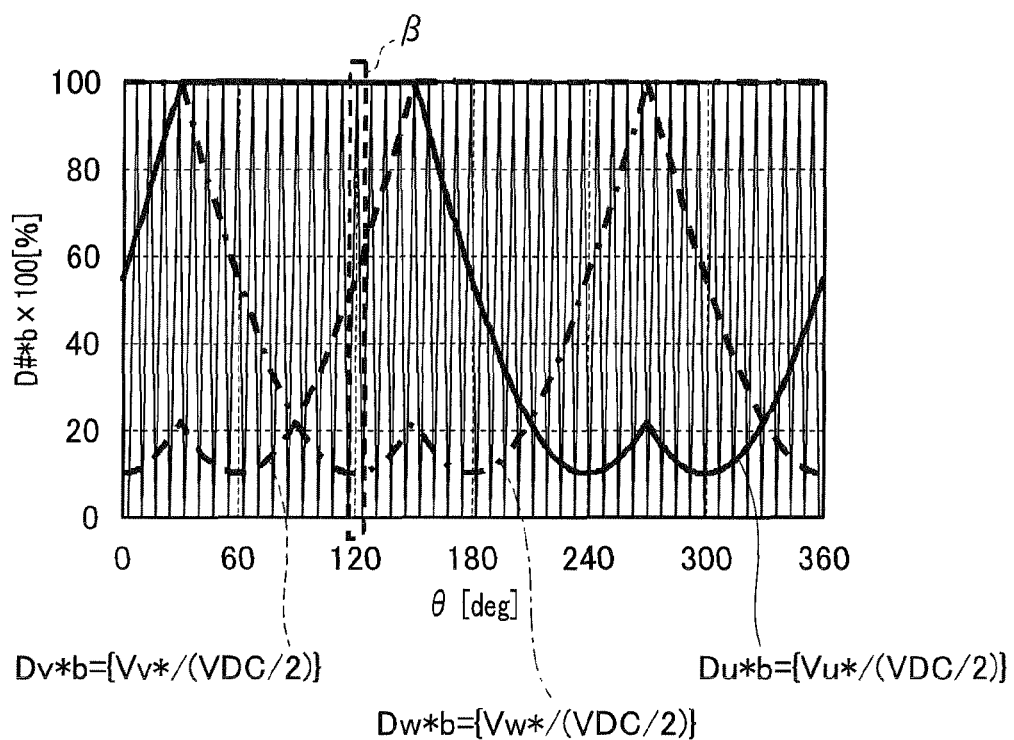
FIG. 9 is a graph schematically illustrating the waveforms of two-phase modulated duty signals according to a second embodiment of the present disclosure and the waveform of the triangular carrier signal according to the second embodiment.

Specifically, the modulation selector 90 generates, based on the normalized three-phase duty signals Du*, Dv*, and Dw*, two-phase modulated duty signals Du*b, Dv*b, and Dw*b. The two-phase modulated duty signals Du*b, Dv*b, and Dw*b are configured such that:

they are successively fixed to be 1 (100%) in order for each 120° electric angle of rotation of the motor 10 while maintaining each in-line voltage based on the duty signals Du*b, Dv*b, and Dw*b having a substantially sinusoidal waveform (see FIG. 9).

In other words, the two-phase modulated duty signals Du*b, Dv*b, and Dw*b cause the high-side switching element and low-side switching element of one selected phase to be respectively maintained on and off for each 120° electric angle of rotation of the motor 10 while changing the selection of the phase to another phase in order.

More specifically, as illustrated in FIG. 9, the modulation selector 90 subtracts the maximum value, i.e. 1, of the duty signals Du*, Dv*, and Dw* from values of the maximum one of the duty signals Du*, Dv*, and Dw*, thus obtaining offset values of the maximum one of the duty signals Du*, Dv*, and Dw*. Then, the modulation selector 90 subtracts, from values of all the duty signals Du*, Dv*, and Dw*, the offset values, thus changing the values of the maximum one of the duty signals Du*, Dv*, and Dw* to the maximum value, i.e. 1. These operations obtain the two-phase modulated duty signals Du*b, Dv*b, and Dw*b illustrated in FIG. 9.

After the generation of the two-phase modulated duty signals Du*b, Dv*b, and Dw*b, the drive signal generator 28 is operative to compare in magnitude between the triangular carrier signal CS and two of the two-phase modulated duty signals Du*b, Dv*b, and Dw*b except for the remaining duty signal that is fixed to the maximum value of 1 (see FIG. 9) in the same approach as the three-phase PWM task set forth above. This obtains a value of the duty cycle of each of the switching elements S#&.

FIGS. 10A to 10F are a joint timing chart schematically illustrating an example of specific operations of the two-phase PWM task executed by the controller 20 at a part γ of the graph illustrated in FIG. 9 corresponding to the rotational angle θ of 30° of the motor 10 or thereabout.

FIG. 10A schematically illustrates the part γ of the graph illustrated in FIG. 9 while the part γ is enlarged only in the horizontal axis representing the electric rotational angle of the motor 10, i.e. the scale of time. More specifically, FIG. 10A schematically illustrates how the two-phase modulated duty signals Du*b, Dv*b, and Dw*b and the triangular carrier signal CS vary during one PWM cycle T. FIGS. 10B to 10F respectively correspond to FIGS. 5B to 5F.

Referring to FIG. 9 and FIGS. 10A to 10F, on the basis of the two-phase PWM task, the two-phase modulated duty signal Du*b is fixed to 1, so that the high-side switching element Sup is fixed to be on and the low-side switching element Sun fixed to be off. While the two-phase modulated duty signal Du*b is fixed to 1, comparison in magnitude between the two-phase modulated duty signals Dv*b and Dw*b and the triangular carrier signal CS generates the PWM signals gv and gw for turning on or off the respective high- and low-side switching elements Svp and Svn and high- and low-side switching elements Swp and Swn.

Figure 11:
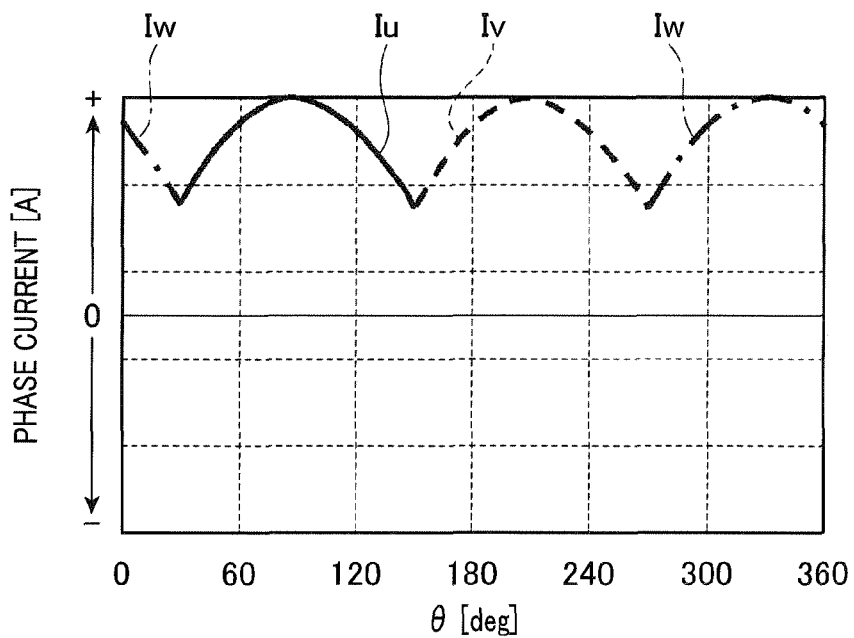
FIG. 11 is a graph schematically illustrating how the bus current varies according to the second embodiment.

As illustrated in FIG. 3, during a present PWM cycle T, the U-phase current iu is flowing through the negative bus Ln as the bus current IDC, so that it is possible for the current sensor 18 to measure a value of the bus current IDC as a value of the U-phase current iu. As illustrated in FIG. 11, because the two-phase modulated duty signal Du*b is fixed to 1 during 120° electric angle of rotation of the motor 10, it is possible for the current sensor 18 to measure a value of the U-phase current iu during 120° electric angle of rotation of the motor 10 (see the angular period from 30° to 150° of the rotation angle θ of the motor 10 in FIG. 11).

Similarly, during the next 120° electric angle of rotation of the motor 10 (see the angular period from 150° to 270° of the rotation angle θ of the motor 10 in FIG. 11), because the two-phase modulated duty signal Dv*b is fixed to 1 (see FIG. 9), it is possible for the current sensor 18 to measure a value of the V-phase current iv.

In the second embodiment, as illustrated in FIGS. 10A to 10C, the two-phase PWM task makes it possible to generate the duration of the output voltage vector V1 of the inverter INV having its center that matches a local maximum peak, i.e. a crest, of the triangular carrier signal CS. Specifically, during the present PWM cycle T, the period from t21a to t22a illustrated in FIGS. 10A to 10F matches the duration of the output voltage vector V1 of the inverter INV. Thus, the current sensor 18 is allowed to measure a value of the bus current IDC as a value of the U-phase current iu within the period from the time t21a to the time t22a for the present PWM cycle T.

On this point, the current sensor 18 according to the second embodiment is configured to measure a value of the U-phase current iu at time t22 within the period from the time t21a to the time t22a; the time t22 matches a local maximum peak, i.e. a crest, of the triangular carrier signal CS during the present PWM cycle T. As illustrated in FIGS. 10D to 10F, because the center of the present PWM cycle T matches a local maximum peak, i.e. a crest, of the triangular carrier signal CS, the average value of each phase current matches a value of a corresponding phase current at the time t22.

As described above, because the controller 20 according to the second embodiment performs the two-phase PWM task for each PWM cycle T, the controller 20 requires the average value of a phase current for each PWM cycle T. In the example illustrated in FIGS. 10A to 10F, the controller 20 easily obtains the average value Iuave of the U-phase current iu during the present PWM cycle T.

That is, the controller 20 easily obtains the average value of a phase current for each PWM cycle T; the high-side switching element corresponding to the phase current is fixed to be on while the low-side switching element of the same phase is fixed to be off.

Other operations of the controller 20 according to the second embodiment are substantially identical to those of the controller 20 according to the first embodiment.

As described above, the configuration of the control system according to the second embodiment generates the duration of an effective voltage vector of the inverter INV having its center timing at which a value of the bus current IDC can be measured. Thus, the configuration of the control system according to the second embodiment achieves the same effects as those achieved by the control system 100 according to the first embodiment.

Third Embodiment

A control system for the motor 10 according to a third embodiment of the present disclosure will be described with reference to FIGS. 12 to 15.

The structure and/or functions of the control system according to the third embodiment are different from those of the control system 100 by the following points. So, the different points will be mainly described hereinafter.

In the control system according to the third embodiment, the modulation selector 90 is configured to perform a further two-phase modulation on the duty signals Du*a, Dv*a, and Dw*a; this two-phase modulation according to the third embodiment will be referred to as a third two-phase modulation hereinafter.

Figure 12:
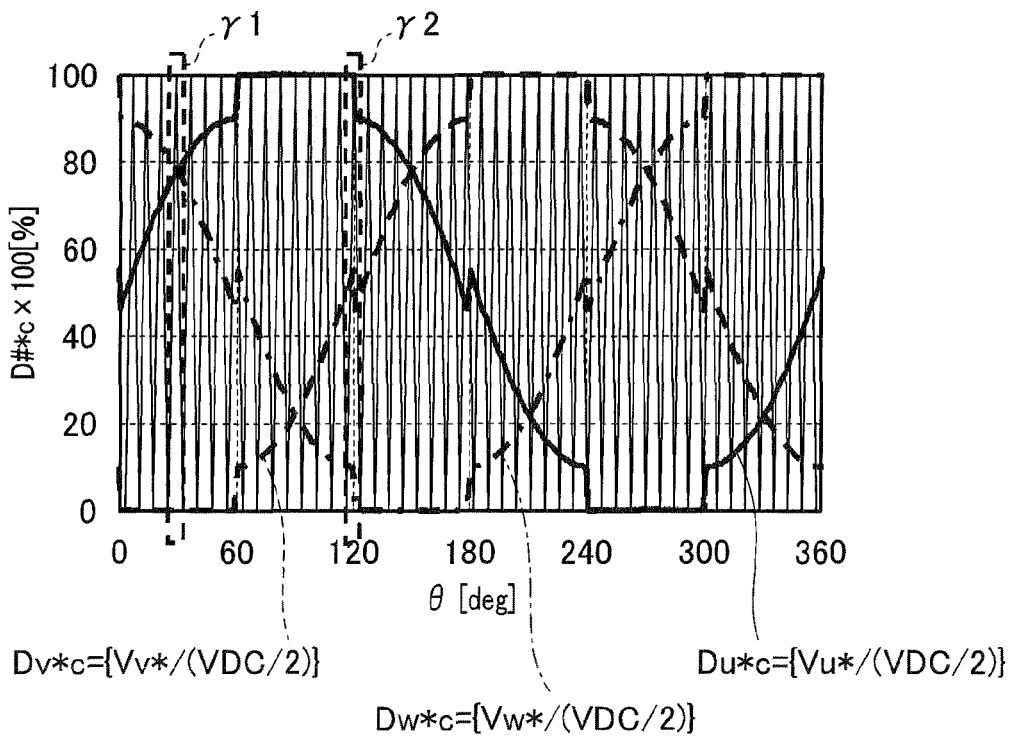
FIG. 12 is a graph schematically illustrating the waveforms of two-phase modulated duty signals according to a third embodiment of the present disclosure and the waveform of the triangular carrier signal according to the third embodiment.

Specifically, the modulation selector 90 generates, based on the normalized three-phase duty signals Du*, Dv*, and Dw*, two-phase modulated duty signals Du*c, Dv*c, and Dw*c. The two-phase modulated duty signals Du*c, Dv*c, and Dw*c are configured such that:

they are successively fixed to be alternately one of zero (0%) and 1 (100%) in order for each 60° electric angle of rotation of the motor 10 while maintaining each in-line voltage based on the duty signals Du*c, Dv*c, and Dw*c having a substantially sinusoidal waveform (see FIG. 12).

Specifically, during 60° electrical angle of rotation of the motor 10, the duty signal Dv*c is fixed to be zero. During next 60° electrical angle of rotation of the motor 10, the duty signal Du*a is fixed to be 1. During next 60° electrical angle of rotation of the motor 10, the duty signal Dw*a is fixed to be zero. During next 60° electrical angle of rotation of the motor 10, the duty signal Dv*c is fixed to be 1. During next 60° electrical angle of rotation of the motor 10, the duty signal Du*a is fixed to be zero. During next 60° electrical angle of rotation of the motor 10, the duty signal Dw*a is fixed to be 1. Thereafter, these operations are repeated.

In other words, the two-phase modulated duty signals Du*c, Dv*c, and Dw*c cause the high-side switching element and low-side switching element of one selected phase to be respectively maintained on and off for each 60° electric angle of rotation of the motor 10 while: changing the selection of the phase to another phase in order; and alternating the on state and off state of the high-side switching element and low-side switching element of one selected phase for each 120° electric angle of rotation of the motor 10.

More specifically, as illustrated in FIG. 12, the modulation selector 90 alternately performs a first two-phase modulation and a second two-phase modulation for each 60° electric angle of rotation of the motor 10.

The first two-phase modulation is designed to:

subtract the minimum value, i.e. 0, of the duty signals Du*, Dv*, and Dw* from values of the minimum one of the duty signals Du*, Dv*, and Dw*, thus obtaining offset values of the minimum one of the duty signals Du*, Dv*, and Dw*; and subtract, from values of all the duty signals Du*, Dv*, and Dw*, the offset values, thus changing the values of the minimum one of the duty signals Du*, Dv*, and Dw* to the minimum value, i.e. 0.

The second two-phase modulation is designed to:

subtract the maximum value, i.e. 1, of the duty signals Du*, Dv*, and Dw* from values of the maximum one of the duty signals Du*, Dv*, and Dw*, thus obtaining offset values of the maximum one of the duty signals Du*, Dv*, and Dw*; and subtract, from values of all the duty signals Du*, Dv*, and Dw*, the offset values, thus changing the values of the maximum one of the duty signals Du*, Dv*, and Dw* to the maximum value, i.e. 1.

These operations of the first and second two-phase modulations obtain the two-phase modulated duty signals Du*c, Dv*c, and Dw*c illustrated in FIG. 12.

After the generation of the two-phase modulated duty signals Du*c, Dv*c, and Dw*c, the drive signal generator 28 is operative to compare in magnitude between the triangular carrier signal CS and two of the two-phase modulated duty signals Du*c, Dv*c, and Dw*c except for the remaining duty signal that is fixed to the minimum value of 0 or the maximum value of 1 each 60° electric angle of rotation of the motor 10 (see FIG. 12) in the same approach as the three-phase PWM task set forth above. This obtains a value of the duty cycle of each of the switching elements S#&.

FIGS. 13A to 13F are a joint timing chart schematically illustrating an example of specific operations of the two-phase PWM task executed by the controller 20 according to the third embodiment at a part β1 of the graph illustrated in FIG. 12 corresponding to the rotational angle θ of 30° of the motor 10 or thereabout. In addition, FIGS. 14A to 14F are a joint timing chart schematically illustrating the example of the specific operations of the two-phase PWM task executed by the controller 20 according to the third embodiment at a part γ2 of the graph illustrated in FIG. 12 corresponding to the rotational angle θ of 120° of the motor 10 or thereabout.

FIG. 13A schematically illustrates the part β1 of the graph illustrated in FIG. 12 while the part β1 is enlarged only in the horizontal axis representing the electric rotational angle of the motor 10, i.e. the scale of time. More specifically, FIG. 13A schematically illustrates how the two-phase modulated duty signals Du*c, Dv*c, and Dw*c and the triangular carrier signal CS vary during one PWM cycle T at the part γ1. FIGS. 13B to 13F respectively correspond to FIGS. 5B to 5F.

Referring to FIG. 12 and FIGS. 13A to 13F, on the basis of the two-phase PWM task, the two-phase modulated duty signal Dv*c is fixed to zero, so that the high-side switching element Svp is fixed to be off and the low-side switching element Svn fixed to be on. While the two-phase modulated duty signal Dv*c is fixed to zero, comparison in magnitude between the two-phase modulated duty signals Du*a and Dw*a and the triangular carrier signal CS generates the PWM signals gu and gw for turning on or off the respective high- and low-side switching elements Sup and Sun and high- and low-side switching elements Swp and Swn.

Figure 15:
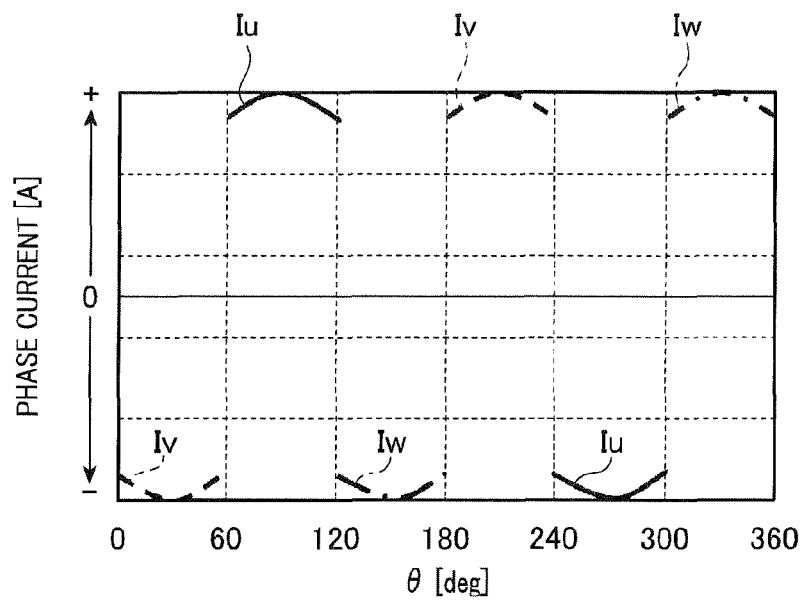
FIG. 15 is a graph schematically illustrating how the bus current varies according to the third embodiment.

As illustrated in FIG. 3, during a present PWM cycle T, the V-phase current iv is flowing through the negative bus Ln as the bus current IDC, so that it is possible for the current sensor 18 to measure a value of the bus current IDC as a value of the V-phase current iv. As illustrated in FIG. 15, because the two-phase modulated duty signal Dv*c is fixed to zero during 60° electric angle of rotation of the motor 10, it is possible for the current sensor 18 to measure a value of the V-phase current iv during 60° electric angle of rotation of the motor 10 (see the angular period from 0° to 60° of the rotation angle θ of the motor 10 in FIG. 15).

In the third embodiment, as illustrated in FIGS. 13A to 13C, the two-phase PWM task makes it possible to generate the duration of the output voltage vector V6 of the inverter INV having its center that matches a local minimum peak, i.e. a trough, of the triangular carrier signal CS.

That is, the current sensor 18 according to the third embodiment is configured to measure a value of the V-phase current iv at time t31 during the duration of the output voltage vector V6 of the inverter INV; the time t31 matches a local minimum peak, i.e. a trough, of the triangular carrier signal CS during the present PWM cycle T. As illustrated in FIGS. 13D to 13F, the average value of each phase current matches a value of a corresponding phase current at the time t31.

Next, FIG. 14A schematically illustrates the part γ2 of the graph illustrated in FIG. 12 while the part γ2 is enlarged only in the horizontal axis representing the electric rotational angle of the motor 10, i.e. the scale of time. More specifically, FIG. 14A schematically illustrates how the two-phase modulated duty signals Du*c, Dv*c, and Dw*c and the triangular carrier signal CS vary during one PWM cycle T at the part γ2. FIGS. 14B to 14F respectively correspond to FIGS. 5B to 5F.

Referring to FIG. 12 and FIGS. 14A to 14F, on the basis of the two-phase PWM task, the two-phase modulated duty signal Du*c is fixed to 1, so that the high-side switching element Sup is fixed to be on and the low-side switching element Sun fixed to be off. While the two-phase modulated duty signal Du*c is fixed to 1, comparison in magnitude between the two-phase modulated duty signals Dv*c and Dw*c and the triangular carrier signal CS generates the PWM signals gu and gw for turning on or off the respective high- and low-side switching elements Svp and Svn and high- and low-side switching elements Swp and Swn.

As illustrated in FIG. 3, during a present PWM cycle T, the U-phase current iu is flowing through the negative bus Ln as the bus current IDC, so that it is possible for the current sensor 18 to measure a value of the bus current IDC as a value of the U-phase current iu. As illustrated in FIG. 15, because the two-phase modulated duty signal Du*c is fixed to 1 during 120° electric angle of rotation of the motor 10, it is possible for the current sensor 18 to measure a value of the U-phase current iu during 120° electric angle of rotation of the motor 10 (see the angular period from 60° to 120° of the rotation angle θ of the motor 10 in FIG. 15).

In the third embodiment, as illustrated in FIGS. 14A to 14C, the two-phase PWM task makes it possible to generate the duration of the output voltage vector V1 of the inverter INV having its center that matches a local maximum peak, i.e. a crest, of the triangular carrier signal CS.

Specifically, the current sensor 18 according to the third embodiment is configured to measure a value of the U-phase current iu at time t41; the time t41 matches a local maximum peak, i.e. a crest, of the triangular carrier signal CS during the present PWM cycle T. As illustrated in FIGS. 14D to 14F, because the center of the present PWM cycle T matches a local maximum peak, i.e. a crest, of the triangular carrier signal CS, the average value of each phase current matches a value of a corresponding phase current at the time t41.

Other operations of the controller 20 according to the third embodiment are substantially identical to those of the controller 20 according to the first embodiment.

As described above, the configuration of the control system according to the third embodiment generates the duration of an effective voltage vector of the inverter INV having its center timing at which a value of the bus current IDC can be measured. Thus, the configuration of the control system according to the third embodiment achieves the same effects as those achieved by the control system 100 according to the first embodiment.

In addition, the control system according to the third embodiment is specially configured to successively change one phase of the high- and low-side switching elements, which are fixed to be on and off or off and on, to another phase thereof in order for each 60° electric angle of rotation of the motor 10. This reduces the measurement cycle of a value of the bus current IDC as a value of a phase current, resulting in reduction of the update cycle of a phase current.

Fourth Embodiment

A control system for the motor 10 according to a fourth embodiment of the present disclosure will be described with reference to FIGS. 16 and 17.

The structure and/or functions of the control system according to the fourth embodiment are different from those of the control system 100 by the following points. So, the different points will be mainly described hereinafter.

In the fourth embodiment, the control system according to the fourth embodiment is designed to perform an offset correction task for correcting the bus current IDC measured by the current sensor 18 if the bus current IDC contains an offset error ΔI.

Figure 16A:
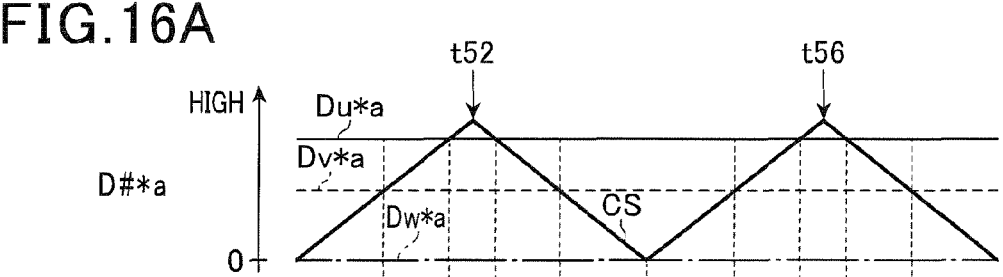
FIGS. 16A to 16C are a joint timing chart schematically illustrating a part of the graph illustrated in FIG. 4 in which the two-phase modulated duty signal is fixed to zero, so that a corresponding high-side switching element is fixed to be off and a corresponding low-side switching element fixed to be on according to a fourth embodiment of the present disclosure.
Figure 16B:
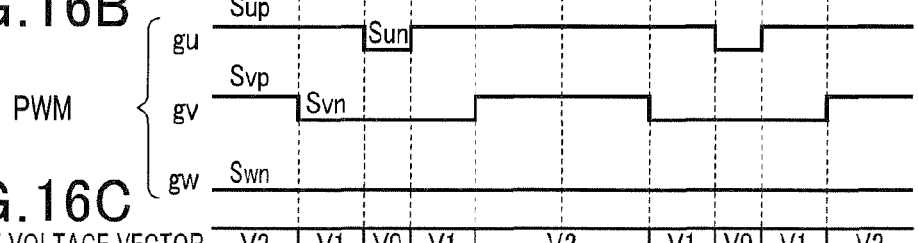
Figure 16C:
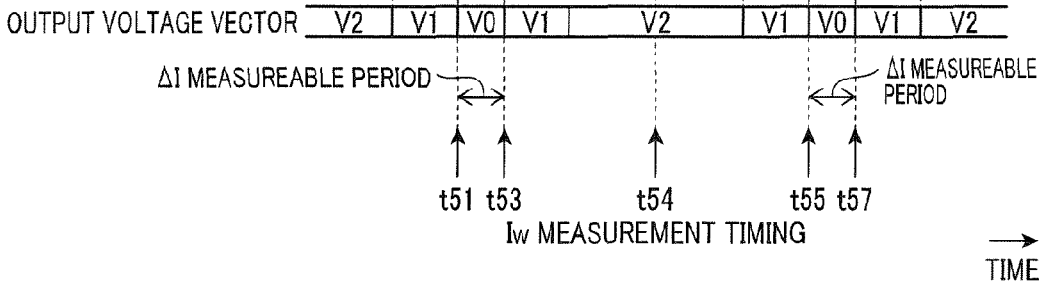

FIGS. 16A to 16C are a joint timing chart schematically illustrating a part of the graph illustrated in FIG. 4 in which the two-phase modulated duty signal Dw*a is fixed to zero, so that the high-side switching element Swp is fixed to be off and the low-side switching element Swn fixed to be on.

In FIGS. 16A to 16C, as described above, in the period for which the output voltage vector of the inverter INV is set to the zero voltage vector V0 or V7 (see each of the period from t51 to t53 and the period from t55 to t57), it is difficult to measure a value of the bus current IDC as a value of a phase current, i.e. the W-phase current iw. This is because no current is flowing through the negative bus Ln in the period for which the output voltage vector of the inverter INV is set to the zero voltage vector V0 or V7.

However, if a value measured by the current sensor 18 during the period for which the output voltage vector of the inverter INV is set to the zero voltage vector V0 or V7 is not zero, the measured value is estimated to be the offset error ΔI. Note that, in FIG. 16, a timing at which a value of the bus current IDC should be measured as a value of the W-phase current is set to time t54.

Figure 17:
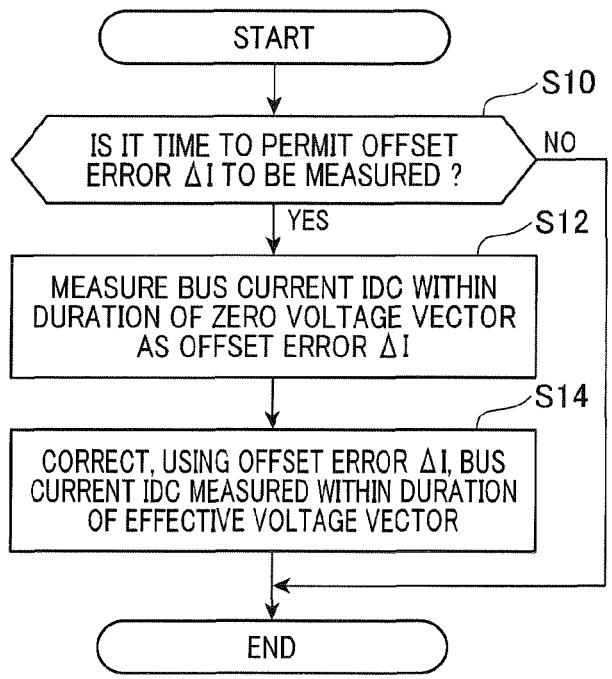
FIG. 17 is a flowchart schematically illustrating an example of specific steps of an offset correction task according to the fourth embodiment.

FIG. 17 is a flowchart schematically illustrating an example of specific steps of the offset correction task executed by the selector 52 of the controller 20. The selector 52 of the controller 20 is designed to repeatedly execute the offset correction task at a predetermined period.

When starting the offset correction task, the selector 52 determines whether it is time to permit the offset error ΔI to be measured in step S10. In other words, in step S10, the selector 52 determines whether the current operating condition of the inverter INV is set to an operating condition in which the offset error ΔI can be measured in step S10. More specifically, in step S10, the selector 52 determines whether the output voltage vector of the inverter INV is set to the zero voltage vector V0 or V7.

In the fourth embodiment, the selector 52 is designed to determine whether the output voltage vector of the inverter INV is set to the zero voltage vector V0, and determine whether the triangular carrier signal CS is reaching a local maximum peak, i.e. a crest in step S10.

Upon determination that the output voltage vector of the inverter INV is set to the zero voltage vector V0 and the triangular carrier signal CS is reaching a local maximum peak, i.e. a crest (YES in step S10), the selector 52 carries out the next operation in step S12. In step S12, the selector 52 causes the current sensor 18 to measure a value of the bus current IDC in response to the affirmative determination (see each of time t52 and time t56 in FIG. 16) if the measured absolute value of the bus current IDC is not zero. Then, the selector 52 obtains the absolute value of the measured value of the bus current IDC as the offset error ΔI in step S12. The operations in steps S10 and S12, the current sensor 18, and the fourth absolute-value calculator 50 serve as, for example, an offset-error measuring module.

Next, the selector 52 subtracts the offset error ΔI from the absolute value of the bus current IDC measured by the current sensor 18 in synchronization with the occurrence of a local minimum peak, i.e. a trough, of the triangular carrier signal CS during the duration of an effective voltage vector, thus correcting the bus current IDC measured by the current sensor 18 in step S14. The effective voltage vector matching the local minimum peak of the triangular carrier signal CS appears closely after the zero voltage vector V0 determined in step S10. After completion of the operation in step S14, the selector 52 terminates the offset correction task. The operation in step S14 serves as, for example, a correcting module.

Otherwise, upon determination that the output voltage vector of the inverter INV is not set to the zero voltage vector V0 and/or the triangular carrier signal CS is not reaching a local maximum peak, i.e. a crest (NO in step S10), the selector 52 terminates the offset correction task.

Other operations of the controller 20 according to the fourth embodiment are substantially identical to those of the controller 20 according to the first embodiment.

As described above, the control system according to the fourth embodiment is configured to correct a value of the bus current IDC measured by the current sensor 18 if the measured value of the bus current IDC contains the offset error ΔI. This configuration achieves, in addition to the effects achieved by the control system 100 according to the first embodiment, an additional effect of further increasing the accuracy of measuring a value of the bus current IDC as a value of a phase current. This results in an improvement of the amplitude correction accuracy by the amplitude correction task.

Fifth Embodiment

A control system for the motor 10 according to a fifth embodiment of the present disclosure will be described with reference to FIGS. 17 and 18.

The structure and/or functions of the control system according to the fifth embodiment are different from those of the control system according to the second embodiment by the following points. So, the different points will be mainly described hereinafter.

In the fifth embodiment, the control system is designed to perform the offset correction task described in the fourth embodiment if the bus current IDC contains an offset error ΔI under the second two-phase modulation being executed described in the second embodiment.

Figure 18A:
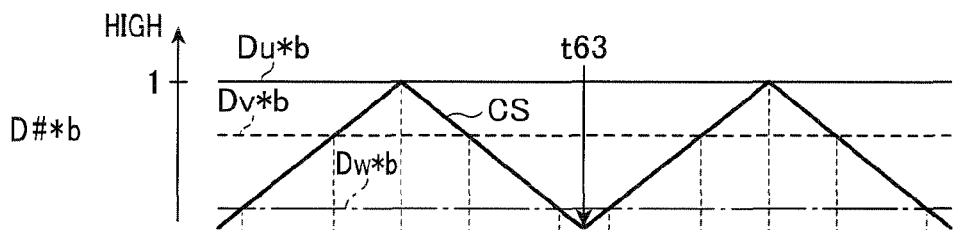
FIGS. 18A to 18C are a joint timing chart schematically illustrating a part of the graph illustrated in FIG. 9 in which the two-phase modulated duty signal is fixed to 1, so that a corresponding high-side switching element is fixed to be on and a corresponding low-side switching element Sun fixed to be off according to a fifth embodiment of the present disclosure.
Figure 18B:
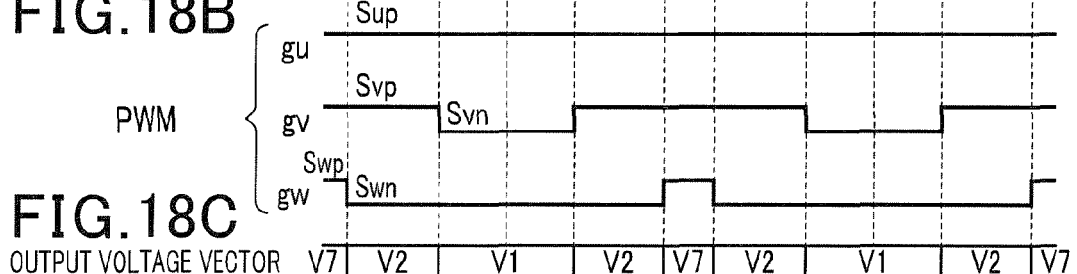
Figure 18C:
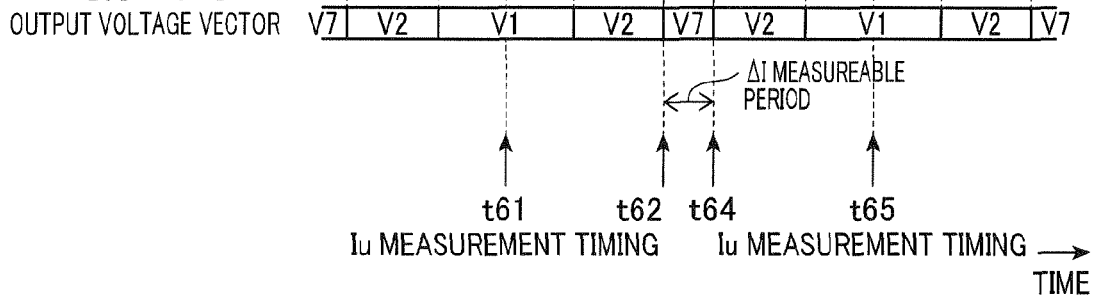

FIGS. 18A to 18C are a joint timing chart schematically illustrating a part of the graph illustrated in FIG. 9 in which the two-phase modulated duty signal Du*b is fixed to 1, so that the high-side switching element Sup is fixed to be on and the low-side switching element Sun fixed to be off.

In FIGS. 18A to 18C, if a value measured by the current sensor 18 is not zero during the period for which the output voltage vector of the inverter INV is set to the zero voltage vector V7, the measured value is estimated to be the offset error ΔI. Note that, in FIG. 18, a timing at which a value of the bus current IDC should be measured as a value of the U-phase current is set to each of time t61 and time t65.

Thus, the selector 52 of the controller 20 according to the fifth embodiment is designed to repeatedly execute the offset correction task illustrated in FIG. 17 at a predetermined period in the same manner as the fourth embodiment except for the following point.

Specifically, in step S10, the selector 52 is designed to determine whether the output voltage vector of the inverter INV is set to the zero voltage vector V7, and determine whether the triangular carrier signal CS is reaching a local minimum peak, i.e. a trough in step S10.

Upon determination that the output voltage vector of the inverter INV is set to the zero voltage vector V7 and the triangular carrier signal CS is reaching a local minimum peak, i.e. a trough (YES in step S10), the selector 52 carries out the next operation in step S12. In step S12, the selector 52 causes the current sensor 18 to measure a value of the bus current IDC in response to the affirmative determination (see time t63 in FIG. 18) if the measured absolute value of the bus current IDC is not zero. Then, the selector 52 obtains the absolute value of the measured value of the bus current IDC as the offset error ΔI in step S12.

Other steps in the offset correction task according to the fifth embodiment are substantially identical to those therein according to the fourth embodiment as long as the zero voltage vector V0 of the fourth embodiment should be read as the zero voltage vector V7 of the fifth embodiment.

As described above, the configuration of the control system according to the fifth embodiment corrects a value of the bus current IDC measured by the current sensor 18 if the measured value of the bus current IDC contains the offset error ΔI. Thus, the configuration of the control system according to the fifth embodiment achieves the same effects as those achieved by the control system according to the fourth embodiment.

Sixth Embodiment

A control system for the motor 10 according to a sixth embodiment of the present disclosure will be described with reference to FIGS. 19 and 20.

The structure and/or functions of the control system according to the sixth embodiment are different from those of the control system according to the third embodiment by the following points. So, the different points will be mainly described hereinafter.

In the sixth embodiment, the control system is designed to perform a dead-time setting task under the third two-phase modulation being executed described in the third embodiment.

The dead-time setting task is designed to:

delay, by a dead time DTA, the rising edge of the low-side turn-on signal g#n for a low-side switching element, which is going to be switched to the on state under the third two-phase modulation being executed; and advance, by, for example, the same dead time DTA, the falling edge of the low-side turn-on signal g#n for the same low-side switching element.

How the controller 20 performs the dead-time setting task will be described hereinafter with reference to FIGS. 19A and 19B.

FIGS. 19A to 19C correspond to FIGS. 14A to 14C, respectively.

Specifically, as illustrated in FIG. 12, FIGS. 19A to 19C show the variation of the two-phase modulated duty signal D#*c from an n-th PWM cycle T(n) to an (n+2)-th PWM cycle T(n+2) via an (n+1)-th PWM cycle T(n+1). During the n-th PWM cycle T(n), comparison in magnitude between the two-phase modulated duty signal D#*c and the triangular carrier signal CS is performed so that the corresponding high- and low-side switching elements Swp and Swn are turned on or off. As illustrated in FIG. 19A, during the n-th PWM cycle T(n), when the low-side turn-on signal g#n is shifted to be off at time t71, the rising edge of the high-side turn-on signal g#p is delayed by the dead time DT set forth above (see FIG. 1), so that the high-side turn-on signal g#p is shifted to be on at time t72 after lapse of the dead time DT since the time t71.

After the n-th PWM cycle T(n), the two-phase modulated duty signal D#*c is going to be switched to be fixed to zero at time t73.

At the time t73, if the two-phase modulated duty signal D#*c were directly switched to be fixed to the minimum value of zero, the falling edge of the high-side turn-on signal g#p could be temporally overlapped with the rising edge of the low-side turn-on signal g# n. This could result in a short circuit between the upper and lower arms of the corresponding phase.

In order to avoid such a short circuit, at the endpoint (see the time t73) of the n-th PWM cycle T(n), the drive signal generator 28 according to the sixth embodiment performs the dead-time setting task that:

adds an additional offset level td to the minimum value of zero of the two-phase modulated duty signal D#*c to produce an offset two-phase modulated duty signal D#*ca that is higher than the minimum level of zero of the two-phase modulated duty signal D#*c by the offset level td (see FIG. 19A); and compare, in magnitude, between the offset two-phase modulated duty signal D#*ca and the triangular carrier signal CS during the (n+1)-th PWM cycle T(n+1) next to the n-th PWM cycle T(n).

This produces:

a dead time DTA between the time t73 at the end point of the n-th PWM cycle T(n) and the rising edge (see time t74) of the corresponding low-side turn-on signal g#n; and the same dead time DTA between the falling edge (see time t75) of the corresponding low-side turn-on signal g# n and at the end point (see time t76) of the (n+1)-th PWM cycle T(n+1).

The length of the dead time DTA matches the magnitude of the offset level to added to the minimum level of zero of the two-phase modulated duty signal D#*c.

At the end point t76 of the (n+1)-th PWM cycle T(n+1), the offset two-phase modulated duty signal D#*ca is switched to the two-phase modulated duty signal D#*c being fixed to the minimum level of zero, and the two-phase modulated duty signal D#*c being fixed to the minimum level of zero is continued during the (n+2)-th PWM cycle T(n+2) following the (n+1)-th PWM cycle T(n+1).

Thus, as illustrated in FIGS. 19B and 19C, it is possible to separate the falling edge of the high-side turn-on signal g#p at the time t73 from the rising edge of the low-side turn-on signal g#n at the time t74 by the dead time DTA. This avoids the occurrence of a short circuit between the upper and lower arms of the corresponding phase when the switching mode of the upper and lower arms of the corresponding phase is switched from a PWM modulation mode to a fixation mode. The PWM modulation mode of the upper and lower arms of one phase represents a mode in which the corresponding high- and low-side switching elements are turned on or off. The fixation mode represents a mode in which the corresponding high- and low-side switching elements are fixed to be off and on or on and off, respectively.

FIGS. 20A to 20D are a joint timing chart schematically illustrating how the three-phase switching elements S#& vary during the n-th PWM cycle T(n) and the (n+1)-th PWM cycle T(n+1) if the two-phase modulated duty signal Dv*c is going to be switched to be fixed to zero at time t73 illustrated in FIGS. 19A to 19C.

As illustrated in FIG. 20B, when the high-side switching element Svp is switched to be off at the time t73, no the low-side switching element Svn is switched to be on (see the dead time DTA). When the dead time DTA has elapsed since the time t73, the low-side switching element Svn is switched to be on at the time t74, making it possible to avoid the occurrence of a short circuit between the high- and low-side switching elements Svp and Svn.

At that time, as illustrated in FIG. 19, the time t73 matches a local minimum peak, i.e. a trough, of the triangular carrier signal CS during the duration of the zero voltage vector V7. Thus, it is possible to measure a value of the bus current IDS as a phase current, i.e. the V-phase current iv at the time t73.

However, in the sixth embodiment, both the high- and low-side switching elements Svp and Svn are off at the time t73 because of the dead time DTA, resulting in no bus current IDS flowing through the negative bus Ln.

Thus, the selector 52 according to the sixth embodiment is configured to perform a disabling task to disable measurement of a value of the bus current IDC during the dead time DTA set by the dead-time setting task.

FIG. 20E schematically illustrates an example of important steps of the dead-time setting task and the disabling task according to the sixth embodiment.

The routine illustrated in FIG. 20E is repeatedly executed by the controller 20, which serves as, for example, a dead time setter and a disabling module, at a predetermined period.

In step S20, the controller 20 determines whether the switching mode of the upper and lower arms of one phase is being switched from the PWM modulation mode to the fixation mode (see the time t73).

Upon determination that the switching mode of the upper and lower arms of one phase is not being switched from the PWM modulation mode to the fixation mode (NO in step S20), the controller 20 terminates the routine.

Otherwise, upon determination that the switching mode of the upper and lower arms of one phase is being switched from the PWM modulation mode to the fixation mode (YES in step S20), the controller 20 delays, by the dead time DTA, the rising edge of the low-side turn-on signal g#n for the low-side switching element of the corresponding phase in step S21.

When the switching mode of the upper and lower arms of one phase is being switched from the PWM modulation mode to the fixation mode so that the high-side switching element of the corresponding one phase is being switched to be off (see the time t73), the controller 20 also disables measurement of a value of the bus current IDC during the dead time DTA in step S22. The operation in step S22 serves as, for example, the disabling module.

Thereafter, the controller 20 advances, by, for example, the same dead time DTA, the falling edge of the low-side turn-on signal g#n for the low-side switching element of the same phase in step S23, and thereafter, terminates the routine.

Other operations of the controller 20 according to the sixth embodiment are substantially identical to those of the controller 20 according to the third embodiment.

As described above, the control system according to the sixth embodiment achieves the following effects in addition to the effects achieved by the control system according to the third embodiment.

Specifically, the control system according to the sixth embodiment performs the dead-time setting task to avoid temporal overlap between the falling edge of the high-side turn-on signal of one phase and the rising edge of the low-side turn-on signal of the same phase, thus avoiding the occurrence of a short circuit due to execution of the third two-phase PWM task.

In addition, the control system according to the sixth embodiment performs the disabling task to disable measurement of a value of the bus current IDC during the dead time DTA, thus avoiding the reduction of the accuracy of measuring a value of the bus current IDC as a phase current.

A modification of the sixth embodiment will be described hereinafter. As illustrated in FIG. 19A, a second triangular carrier signal CS 1 higher in magnitude than the triangular carrier signal CS by a predetermined level is prepared. During the n-th PWM cycle T(n), comparison in magnitude between the two-phase modulated duty signal D#*c and the triangular carrier signal CS is performed for the low-side switching element Swn so that the low-side switching element Swn is turned on or off. During the n-th PWM cycle T(n), comparison in magnitude between the two-phase modulated duty signal D#*c and the second triangular carrier signal CS1 is performed for the high-side switching element Swp so that the high-side switching element Swp is turned on or off. This ensures a dead time DT corresponding to the predetermined level between the on state of the low-side switching element Swn and the high-side switching element Swp.

Similarly, during the (n+1)-th PWM cycle T(n+1), comparison in magnitude between the two-phase modulated duty signal D#*ca and the triangular carrier signal CS is performed for the low-side switching element Swn so that the low-side switching element Swn is turned on or off.

During the (n+1)-th PWM cycle T(n+1), comparison in magnitude between the two-phase modulated duty signal D#*ca and the second triangular carrier signal CS1 is performed for the high-side switching element Swp so that the high-side switching element Swp is turned on or off.

For the next (n+2)-th PWM cycle T(n+2), the same comparing operations are performed.

That is, setting the length of the dead time DTA to be matched to the predetermined level ensures:

the dead time DTA between the falling edge (t73) of the on duration of the high-side switching element Swp and the rising edge (t74) of the on duration of the low-side switching element Swn; and the same dead time DTA between the falling edge (t73) of the on duration of the low-side switching element Swn and the rising edge (t74) of the on duration of the low-side switching element Swn for the next (n+2)-th PWM cycle T(n+2).

Thus, it is possible for the control system according to the modification to achieve substantially the same effects achieved by the control system according to the sixth embodiment.

Seventh Embodiment

A control system for the motor 10 according to a seventh embodiment of the present disclosure will be described with reference to FIGS. 21 and 22.

The structure and/or functions of the control system according to the seventh embodiment are different from those of the control system according to the third embodiment by the following points. So, the different points will be mainly described hereinafter.

In the seventh embodiment, the control system is designed to perform a modulation selection task to select one of the third two-phase modulation described in the third embodiment and the three-phase modulation described in the first embodiment. Specifically, a modulation selector 90A of the controller 20 according to the seventh embodiment is designed to perform the modulation selection task. The modulation selection task aims to address a risk that the measurement accuracy of a value of the bus current IDC may be reduced due to ringing. Ringing may take place in a phase current i#& corresponding to the bus current IDC immediately after switching of a current output voltage vector of the inverter INV to another.

Figure 21A:
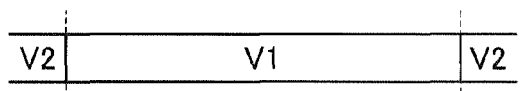
FIGS. 21A and 21B schematically illustrate ringing taking place in a U-phase current immediately after the output voltage vector of the inverter is shifted from an effective voltage vector to another according to a seventh embodiment of the present disclosure.
Figure 21B:
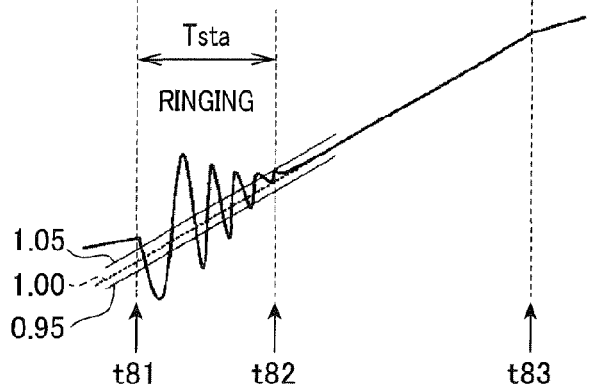

FIGS. 21A and 21B schematically illustrate ringing taking place in a U-phase current iu immediately after the output voltage vector of the inverter INV is shifted from the effective voltage vector V2 to the effective voltage vector V1. In other words, they schematically illustrate the ringing taking place in a U-phase current iu immediately after the switching mode of the upper and lower arms of U-phase is switched from the PWM modulation mode to the fixation mode. FIGS. 21A and 21B correspond to respective FIGS. 15C and 15D.

In an example illustrated in FIGS. 21A and 21B, it is assumed that a stabilized value of the U-phase current iu is normalized to be set to 1.

In this assumption, a time until which the fluctuation of a U-phase current iu has been stabilized to be within an allowable range since the switching of the inverter's output voltage vector from the effective voltage vector V2 to the effective voltage vector V1 is set to a finite value longer than zero. The allowable range is for example set to be plus or minus 0.05 of the corresponding stabilized value (1) of the U-phase current iu. In the seventh embodiment, the time, especially a maximum value of the time, is defined as a stabilization time Tsta.

If the length of the duration of the effective voltage vector V1 as the output voltage vector of the inverter INV was reduced due to a decrease of the level of each command duty signal D#*, a timing to measure a value of the bus current IDC matching a local maximum peak, i.e. a crest, of the triangular carrier signal CS might be contained within a predetermined period. The predetermined period is a period until which the stabilization time Tsta has elapsed since the time t81 showing the switching timing of the output voltage vector of the inverter INV from the effective voltage vector V2 to the effective voltage vector V1. This might result in a reduction of the measurement accuracy of the bus current IDC.

Figure 22A:
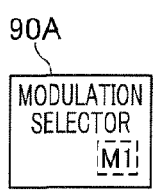
FIG. 22A is a block diagram of a modulation selector of the controller according to the seventh embodiment.
Figure 22B:
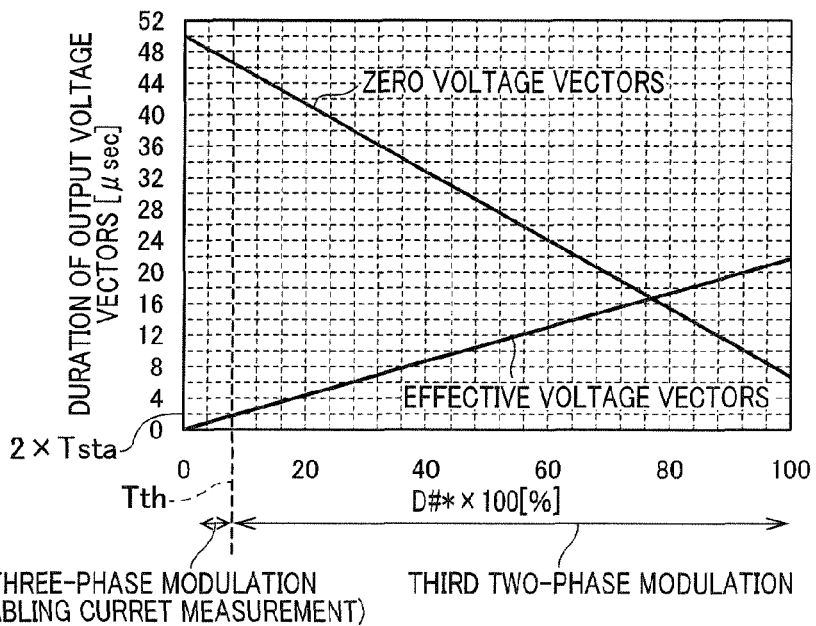
FIG. 22B is a view schematically illustrating a map including information representing the relationship between: the variation of the duration of the output voltage vectors; and the variation of the level of each command duty signal according to the seventh embodiment.

In view of the circumstances set forth above, the modulation selector 90A stores therein a map M1 in data-table format, in mathematical expression fat mat, and/or program format (see FIG. 22A). As illustrated in FIG. 22B, the map M1 includes information representing the relationship between:

the variation of the duration of the output voltage vectors Vi, which include the zero voltage vectors V0 and V7 and the effective voltage vectors V1 to V6; and the variation of the level of each command duty signal D#&.

The map M1 also includes a threshold level Tth of each command duty signal D#& set to be higher than zero corresponding the duty cycle of the inverter INV of 0% and lower than 1 corresponding to the duty cycle 100%.

In FIG. 22B, the level of each command duty signal D#& is illustrated as a percent, that is, illustrated as a corresponding percent of the duty cycle.

The threshold level Tth separates the total range of each command duty signal D#& into a first range equal to or higher than zero (0%) and lower than the threshold level Tth, and a second range equal to or higher than the threshold level Tth and equal to or lower than 1 (100%).

The threshold level Tth is set such that the duration of an effective voltage vector of the inverter INV, within which a measurement timing of the bus current IDC is included, is shorter than the stabilization time Tsta. In the seventh embodiment, the threshold level Tth is set to a predetermined level of each command duty signal D#& at which a corresponding duration of an effective voltage vector including a measurement timing of the bus current IDC is equal to a time that is double the stabilization time Tsta. This aims to reliably reduce the influence of ringing in the bus current IDC. Assuming that the stabilization time Tsta is set to 1 μsec, the threshold level Tth is set to 0.08 (8%) at which a corresponding duration of an effective voltage vector including a measurement timing of the bus current IDC is equal to 2 μsec obtained by 2×Tsta (1 μsec).

The first range is defined to include the stabilization time Tsta with a sufficient margin. That is, the modulation selector 90A according to the seventh embodiment is designed to, when the level of each duty signal D#& is within the first range, disable execution of the two-phase modulation while performing the three-phase modulation. This reliably maintains the measurement accuracy of a value of the bus current IDC with a higher accuracy. Thus, the first range will also be referred to as a three-phase modulation range, and the second range will also be referred to as a two-phase modulation range.

Figure 22C:
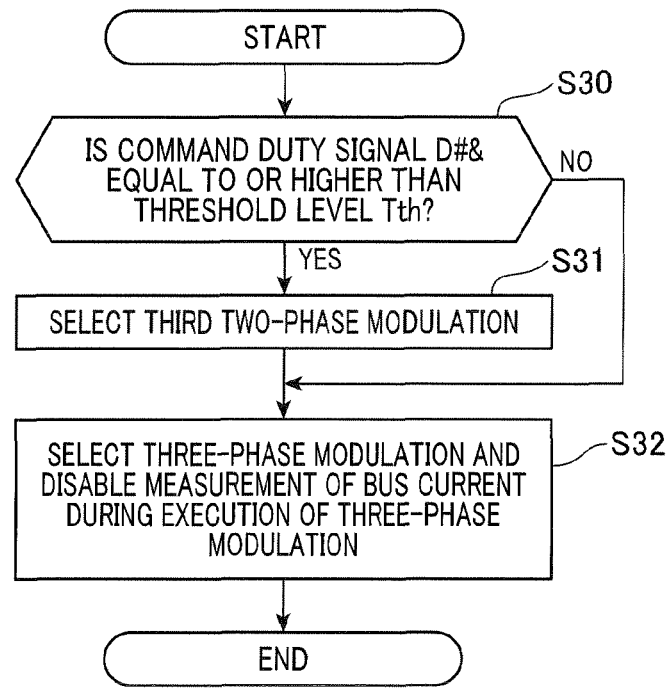
FIG. 22C is a flowchart schematically illustrating an example of important steps of a modulation selection task according to the seventh embodiment.

FIG. 22C schematically illustrates an example of important steps of the modulation selection task according to the seventh embodiment.

The routine illustrated in FIG. 22C is repeatedly executed by the controller 20 at a predetermined period.

In step S30, the modulation selector 90A of the controller 20 reads the threshold level Tth from the map M1, and determines whether a level of each command duty signal D# & is equal to or higher than the threshold level Tth.

Upon determination that the level of each command duty signal D#& is equal to or higher than the threshold level Tth (YES in step S30), the modulation selector 90A determines that execution of the two-phase modulation cannot reduce the measurement accuracy of a value of the bus current IDC. Then, the modulation selector 90A selects the third two-phase modulation, thus generating, based on the command duty signals Du*, Dv*, and Dw*, the two-phase modulated duty signals Du*c, Dv*c, and Dw*c described in the third embodiment in step S31.

Otherwise, upon determination that the level of at least one command duty signal D#& is lower than the threshold level Tth (NO in step S30), the modulation selector 90A determines that execution of the two-phase modulation might reduce the measurement accuracy of a value of the bus current IDC. Then, the modulation selector 90A selects the three-phase modulation, thus sending the corrected three-phase command voltages Vu*a, Vv*a, and Vw*a to the drive signal generator 28 as they are, and disables measurement of a value of the bus current IDC during execution of the three-phase modulation in step S32. The operation in step S32 serves as, for example, a disabling module.

Other operations of the controller 20 according to the seventh embodiment are substantially identical to those of the controller 20 according to the third embodiment.

As described above, the control system according to the seventh embodiment achieves the following effect in addition to the effects achieved by the control system according to the third embodiment.

Specifically, the control system according to the seventh embodiment performs the modulation selecting task that selects the three-phase modulation to disable measurement of a value of the bus current IDC if a level of at least one command duty signal D#& is lower than the threshold level Tth so that there may be a risk to reduce the measurement accuracy of a value of the bus current IDC. This therefore results in more improvement of the measurement accuracy of a value of the bus current IDC.

Eighth Embodiment

A control system for the motor 10 according to an eighth embodiment of the present disclosure will be described with reference to FIGS. 23 and 24.

The structure and/or functions of the control system according to the eighth embodiment are different from those of the control system according to the seventh embodiment by the following points. So, the different points will be mainly described hereinafter.

In the eighth embodiment, the modulation selection task according to the seventh embodiment is changed.

Figure 23:
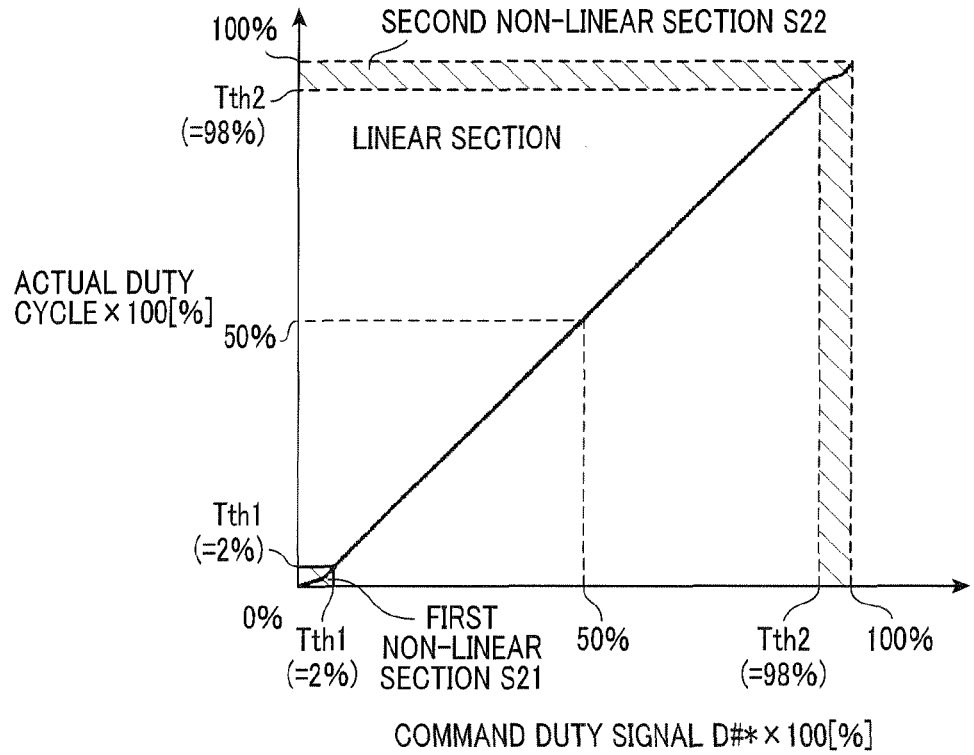
FIG. 23 is a graph schematically illustrating the relationship between the variation of each command duty signal and that of a corresponding actual duty cycle of the inverter that is actually driven based on each command duty signal according to an eighth embodiment of the present disclosure.

FIG. 23 schematically illustrates, as a graph, the relationship between the variation of each command duty signal D#* and that of a corresponding actual duty cycle of the inverter INV that is actually driven based on each command duty signal D#*.

As described in the first embodiment, the variation of each duty signal D#* shows that of a corresponding duty cycle. Thus, the graph showing the relationship between the variation of each duty signals D#* and that of a corresponding actual duty cycle theoretically has a linear shape. However, the graph illustrated in FIG. 23 includes first and second non-linear sections S21 and S22.

In the eighth embodiment, the first non-linear section S21 is defined, on the graph illustrated in FIG. 23, between:

a first point where the level of each duty signal D# is zero (0%) and the value of a corresponding actual duty cycle is zero (0%); and a second point where the level of each duty signal D#* is 0.02 (2%) and the value of a corresponding actual duty cycle is 0.02 (2%).

Similarly, in the eighth embodiment, the second non-linear section S22 is defined, on the graph illustrated in FIG. 23, between:

a third point where the level of each duty signal D#* is 0.98 (98%) and the value of a corresponding duty cycle is 0.98 (98%); and a fourth point where the level of each duty signal D#* is 1 (100%) and the value of a corresponding duty cycle is 1 (100%).

Why the graph illustrated in FIG. 23 has the first and second non-linear sections S21 and S22 is due to, for example, the variations in the dead times DT given to the respective PWM signals g# and/or those in the on characteristics, which include the turn-on times, of the respective switching elements S#&.

If the level of each duty signal D# is within the first non-linear section S21 or the second non-linear section S22, the duration of an effective voltage vector of the inverter INV, within which a measurement timing of the bus current IDC is included, may be reduced as comparison to the duration of the same effective voltage vector if the level of each duty signal D#* is within neither the first non-linear section S21 nor the second non-linear section S22.

In addition, if the level of each duty signal D#* is within the first non-linear section S21 or the second non-linear section S22, the operations of the inverter INV may become instable. Under the instable state of the inverter INV within the first non-linear section S1 or the second non-linear section S22, a deviation, from each duty signals D#*, of a corresponding actual duty cycle may reduce a period during which a value of the bus current IDC used by the amplitude correction task can be measured. As described in the seventh embodiment, in order to measure a value of the bus current IDC with high accuracy, a time enough to avoid the influence of ringing is required. Thus, there may be a risk to reduce the measurement accuracy of a value of the bus current IDC if the two-phase modulation is carried out while the level of each duty signal D#* is within the first non-linear section S21 or the second non-linear section S22.

Figure 24A:
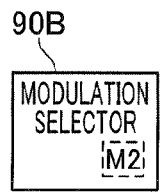
FIG. 24A is a block diagram of a modulation selector of the controller according to the eighth embodiment.
Figure 24B:
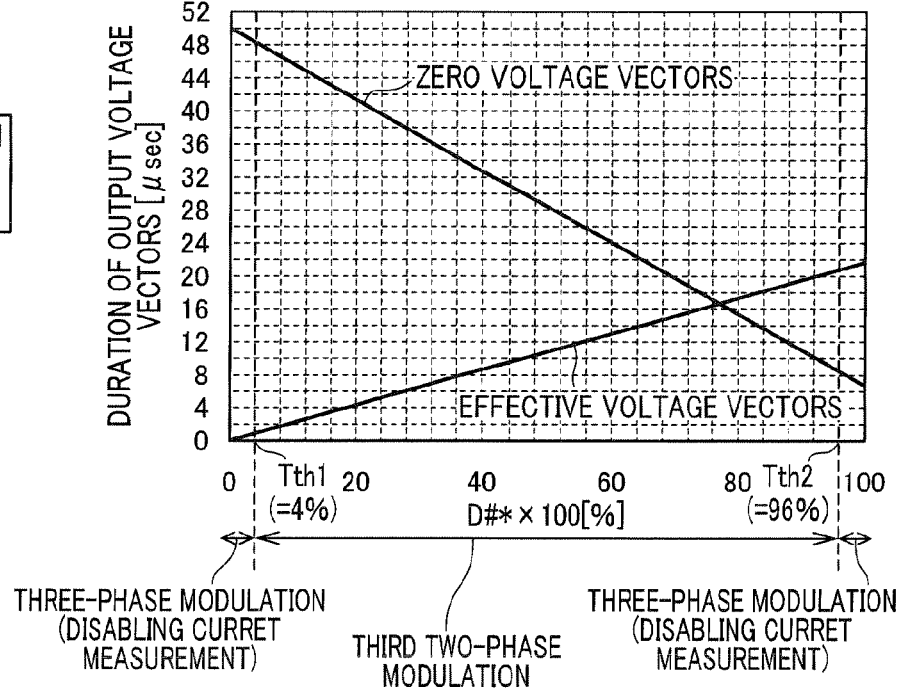
FIG. 24B is a view schematically illustrating a map including information representing the relationship between: the variation of the duration of the output voltage vectors; and the variation of the level of each command duty signal according to the eighth embodiment.

In order to address such a risk, a modulation selector 90B of the controller 20 according to the eighth embodiment stores therein a map M2 in data-table format, in mathematical expression format, and/or program format (see FIG. 24A). As illustrated in FIG. 24B, the map M2 includes information representing the relationship between:

the variation of the duration of the output voltage vectors Vi, which include the zero voltage vectors V0 and V7 and the effective voltage vectors V1 to V6; and the variation of the level of each command duty signal D#&. The map M2 also includes a first threshold level Tth1 and a second threshold level Tth2 of each command duty signal D#&.

In order to reliably maintain the measurement accuracy of a value of the bus current IDC at a higher level, the first threshold level Tth1 is set to 0.04 that is double 0.02 (2%), and the second threshold level Tth2 is set to 0.96 (96%) lower than 0.98 (98%). The first threshold level Tth1 and the second threshold level Tth2 separate the total range of each command duty signal D#& into:

a first range equal to or higher than zero (0%) and lower than the first threshold level Tth1;

a second range equal to or higher than the first threshold level Tth1 and equal to or lower than the second threshold level Tth2; and a third range higher than the second threshold level Tth2 and equal to or lower than 1 (100%).

The first range is defined to include the first non-linear section S21 with a sufficient margin, and the third range is defined to include the second non-linear section S22 with a sufficient margin. That is, the modulation selector 90B according to the eighth embodiment is designed to, when the level of each duty signal D#& is within the first range or the third range, disable execution of the two-phase modulation while performing the three-phase modulation. This reliably maintains the measurement accuracy of a value of the bus current IDC with a higher accuracy. Thus, each of the first and third ranges will also be referred to as a three-phase modulation range, and the second range will also be referred to as a two-phase modulation range.

Figure 24C:
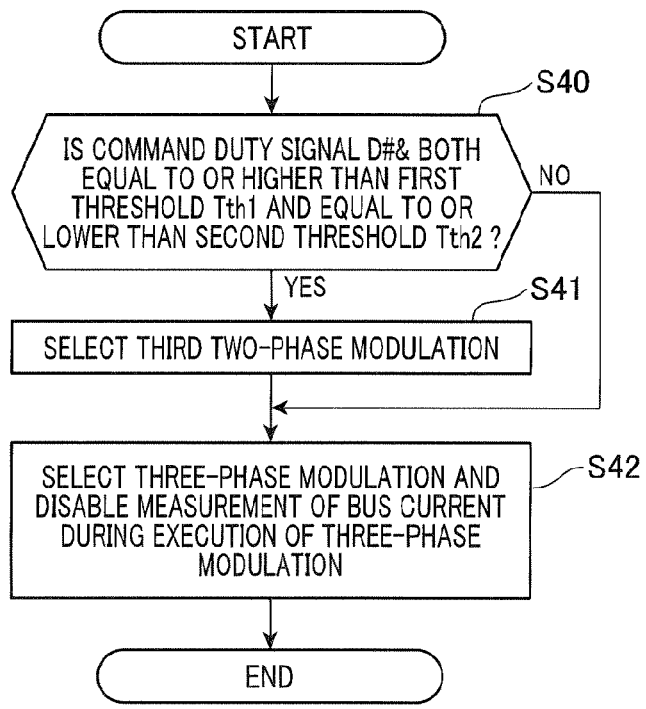
FIG. 24C is a flowchart schematically illustrating an example of important steps of the modulation selection task according to the eighth embodiment.

FIG. 24C schematically illustrates an example of important steps of the modulation selection task according to the eighth embodiment.

The routine illustrated in FIG. 24C is repeatedly executed by the controller 20 at a predetermined period.

In step S40, the modulation selector 90B of the controller 20 reads the first and second threshold levels Tth1 and Tth2 from the map M2, and determines whether a level of each command duty signal D#& is both equal to or higher than the first threshold level Tth1 and equal to or lower than the second threshold level Tth2.

Upon determination that the level of each command duty signal D#& is both equal to or higher than the first threshold level Tth1 and equal to or lower than the second threshold level Tth2 (YES in step S40), the modulation selector 90B determines that execution of the two-phase modulation cannot reduce the measurement accuracy of a value of the bus current IDC. Then, the modulation selector 90B selects the third two-phase modulation, thus generating, based on the command duty signals Du*, Dv*, and Dw*, the two-phase modulated duty signals Du*c, Dv*c, and Dw*c described in the third embodiment in step S41. The operation in step S42 serves as, for example, a disabling module.

Otherwise, upon determination that the level of at least one command duty signal D#& is either lower than the first threshold level Tth1 or lower than the second threshold level Tth2 (NO in step S40), the modulation selector 90B determines that execution of the two-phase modulation might reduce the measurement accuracy of a value of the bus current IDC. Then, the modulation selector 90B selects the three-phase modulation, thus sending the corrected three-phase command voltages Vu*a, Vv*a, and Vw*a to the drive signal generator 28 as they are, and disables measurement of a value of the bus current IDC during execution of the three-phase modulation in step S42.

Other operations of the controller 20 according to the eighth embodiment are substantially identical to those of the controller 20 according to the third embodiment.

As described above, the control system according to the eighth embodiment achieves the following effect in addition to the effects achieved by the control system according to the third embodiment.

Specifically, the control system according to the eighth embodiment performs the modulation selecting task that selects the three-phase modulation to disable measurement of a value of the bus current IDC if a level of at least one command duty signal D#& is lower than the first threshold level Tth1 or higher than the second threshold level Tth2 so that there may be a risk to reduce the measurement accuracy of a value of the bus current IDC. This therefore results in a more improvement of the measurement accuracy of a value of the bus current IDC.

The first to eighth embodiments can be freely combined with each other, and they can be changed and/or modified within the scope of the present disclosure.

The method of correcting the bus current IDC if the bus current IDC contains an offset error ΔI described in the fourth embodiment or the fifth embodiment can be applied to the control system for performing the third two-phase modulation according to the third embodiment.

In the first embodiment, the modulation selector 90 divides the corrected three-phase command voltages Vu*a, Vv*a, and Vw*a by the half of the inverter input voltage VDC, thus generating normalized command duty signals Du*, Dv*, and Dw*, respectively. Then, the modulation selector 90 generates, based on the normalized three-phase duty signals Du*, Dv*, and Dw*, the two-phase modulated duty signals Du*a, Dv*a, and Dw*a. However, the present disclosure is not limited to the configuration.

Specifically, the modulation selector 90 can use corrected three-phase command voltages Vu*a, Vv*a, and Vw*a as command duty signals without using normalization, and perform the two-phase modulation on the command duty signals Vu*a, Vv*a, and Vw*a to generate two-phase modulated duty signals Du*aa, Dv*aa, and Dw*aa. In this modification, the waveforms of the command duty signals Vu*a, Vv*a, and Vw*a match those of the respective duty signals Du*, Dv*, and Dw* illustrated in FIG. 4A as long as the amplitude of each of the command duty signals Vu*a, Vv*a, and Vw*a is the half level of the inverter input voltage VDC. Similarly, the waveforms of the two-phase modulated duty signals Du*aa, Dv*aa, and Dw*aa match those of the respective two-phase modulated duty signals Du*a, Dv*a, and Dw*a illustrated in FIG. 4B as long as the amplitude of each of the two-phase modulated duty signals Du*aa, Dv*aa, and Dw*aa is the half level of the inverter input voltage VDC. The other embodiments can be modified in the same approach as described set in the first embodiment set forth above.

In each of the first to eighth embodiments, the command-voltage setting module based on the combination of the command current setter 22 and the command voltage setter 24 is configured to:

set three-phase command currents iu*, iv*, and iw* based on the request torque Trq* input thereto from the request torque input unit 36; and set, based on the three-phase command currents iu*, iv*, and iw* and the angular velocity w, three-phase command voltages Vu*, Vv*, and Vw*.

However, the present invention is not limited to the configuration.

In this modification, the rotor has a direct axis (d-axis) in line with a direction of magnetic flux created by the N pole, in other words, in line with a rotor N pole center line. The rotor also has a quadrature axis (q-axis) with a phase being π/2 radian in electrical angle leading with respect to a corresponding d-axis during rotation of the rotor. In other words, the q-axis is electromagnetically orthogonal to the d-axis.

The d and q axes constitute a d-q coordinate system (rotating coordinate system) defined in the rotor of the motor 10.

An inductance L in the d-axis is equal to an inductance L in the q-axis because the permanent magnets have a magnetic permeability constant equal to that of air. This type of motors are called "non-salient pole motors".

Specifically, a command-voltage setting module 22 according to this modification can be configured to set a command d-axis current id* and a command q-axis current iq* in the d-q coordinate system of the rotor based on the request torque Trq*.

The command voltage setter 24 according to this modification can be configured to receive the command d-axis and q-axis currents id* and iq* output from the command current setter 22, and the angular velocity ω output from the angular velocity calculator 26. The command voltage setter 24 can also be configured to set, based on the command d-axis and q-axis currents id* and iq* and the angular velocity ω, command d-axis and q-axis voltages Vd* and Vq* in the d-q coordinate system of the rotor.

For example, the command voltage setter 24 according to this modification can be configured to set the command d-axis and q-axis voltages Vd* and Vq* using the following voltage equation [EQ3]:

$$\begin{bmatrix} Vd^* \\ Vq^* \end{bmatrix} = \begin{bmatrix} Ls + R & -\omega L \\ \omega L & Ls + R \end{bmatrix} \begin{bmatrix} id^* \\ iq^* \end{bmatrix} + \begin{bmatrix} 0 \\ \omega \phi \end{bmatrix} \quad [EQ\ 3]$$

where s, which can also be expressed as $$\frac{d}{dt},$$

represents differential operator.

The command voltage setter 24 according to this modification further can be configured to store therein, for example, a map in data-table format, in mathematical expression format, and/or program format. The map includes information indicative of, for example, variables of three-phase command voltages Vu*, Vv*, and Vw* in the three-phase coordinate system as a function of the rotational angle θ of the motor 10 and variables of the command voltages Vd* and Vq* in the d-q coordinate system. Specifically, the command voltage setter 24 can be configured to convert, based on the map and the rotational angle θ, the command voltages Vd* and Vq* in the d-q axes into three-phase command voltages Vu*, Vv*, and Vw* for the respective AC power input terminals of the motor 10. That is, the command voltage setter 24 can serve to obtain, based on the request torque Trq*, the three-phase command voltages Vu*, Vv*, and Vw* as feedforward manipulated variables, i.e. open-loop manipulated variables, for the motor 10.

In each of the first to eighth embodiments, none of the first to third deviation calculators 60, 62, and 64 are limited to the structure that calculates a manipulated variable using the sum of a proportional gain term and an integral gain term of a PI algorithm. Specifically, all of the deviation calculators 60, 62, and 64 can be configured to calculate a manipulated variable using the sum of a proportional gain term, an integral gain term, and a derivative gain term of a known PID algorithm.

In the eighth embodiment, each of the first and third ranges is defined as the three-phase modulation range; when the level of at least one command duty signal D#& is included in the three-phase modulation range, the modulation selector 90B performs the three-phase modulation while disabling measurement of a value of the bus current IDC. However, the present disclosure is not limited to the configuration. Specifically, at least one of the first and third ranges can be defined as the three-phase modulation range.

In each of the first to eighth embodiments, the current sensor 18 is operative to measure a value of the bus current IDC flowing through the negative bus Ln. However, the current sensor 18 can be operative to measure a value of the bus current IDC flowing through the positive bus Lp.

In each of the first to eighth embodiments, the control system is provided with the battery, i.e. DC power source, 12, and operative to convert DC power supplied from the DC power source into AC power via the inverter INV, thus supplying the AC power to the motor 10, but the present disclosure is not limited thereto.

Specifically, the control system can be provided with a step-up converter and a battery, which serve as a DC power source. The control system can be configured such that DC power supplied from the battery is boosted by the step-up converter. The control system can be operative to convert the DC power boosted by the step-up converter into AC power via the inverter INV, thus supplying the AC power to the motor 10.

Various types of rotary machines according to the present disclosure can be installed in various types of devices other than electric power steering systems. The control systems according to the present disclosure can be configured to control, as a controlled variable, the rotational speed of a rotary machine.

In each of the aforementioned embodiments, an SPMSM is used as an example of rotary machines, but another type of rotary machines, such as an Interior Permanent Magnet Synchronous Motor, can be used. An induction motor can be used as an example of rotary machines set forth above. If the motor 10 is designed as an induction motor, the command-current setting module according to the present disclosure can be configured to set command voltages Vu*, Vv*, and Vw* based on V/f control. For example, the V/f control is a control method in which the output voltage (V) of the inverter INV is adjusted proportionally to the output frequency (f) of the inverter INV.

While illustrative embodiments of the present disclosure have been described herein, the present disclosure is not limited to the embodiments described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A system for controlling a three-phase inverter, having high- and low-side switching elements for each phase thereof, for supplying, based on direct-current (DC) power from a DC power source, alternating-current (AC) power to a three-phase rotary machine for rotating the three-phase rotary machine, the system comprising:
a two-phase modulation module configured to perform two-phase modulation on three-phase command signals for controlling the three-phase inverter, each having a predetermined amplitude, to generate two-phase modulated command signals for the three-phases of the three-phase inverter,
the two-phase modulated command signals being configured such that one of the two-phase modulated command signals is successively selected to be fixed to one of an upper limit and a lower limit of a corresponding one of the three-phase command signals for each predetermined period,
two of the two-phase modulated command voltage signals except for one of the two-phase modulated command signals fixed to one of the upper limit and the lower limit being referred to as first and second two-phase modulated command signals; and
an on-off performing module configured to:
compare in magnitude a triangular carrier wave, having a predetermined amplitude based on the amplitude of each of the three-phase command signals, with the first and second two-phase modulated command signals; and
perform, based on a result of the comparison, on-off operations of the high- and low-side switching elements of two phases of the three-phase inverter corresponding to the first and second two-phase modulated command signals while fixing, to be on or off, the high- and low-side switching elements of a remaining phase of the three-phase inverter; and
a current measuring module configured to measure a value of a current flowing through one of first and second buses connected between the DC power source and the three-phase inverter when a local peak of the triangular carrier signal occurs while none of the high-side switching elements of all the three-phases are on or none of the low-side switching elements of all the three-phases are on.

2. The system according to claim 1, wherein:
the two-phase modulated command signals generated by the two-phase modulation module for the respective three-phases of the three-phase inverter is configured such that:
one of the two-phase modulated command signals is sequentially selected to be fixed to one of the upper limit and the lower limit thereof for each 60° electric angle of rotation of the rotary machine; and
the current measuring module is configured to measure a value of the current flowing through one of the first and second buses when one of a local maximum peak and a local minimum peak of the triangular carrier signal occurs while none of the high-side switching elements of all the three-phases are on or none of the low-side switching elements of all the three-phases are on.

3. The system according to claim 2, further comprising:
a dead time setter configured to, when the high-side switching element of a phase of the three-phase inverter is going to be switched from a first mode, in which the on-off operations thereof are performed, to second mode in which the high-side switching element is fixed be off, and the low-side switching element of the phase is going to be switched from the first mode to a third mode in which the low-side switching element is fixed to be on, delay, by a dead time, a start edge on duration of the low-side switching element of the phase, and advance, by the dead time, an end edge of the on duration thereof, thus preventing the high- and low-side switching elements of the phase from being on simultaneously.

4. The system according to claim 3, further comprising:
a disabling module configured to disable the measuring module from measuring a value of the current during each of the dead times.

5. The system according to claim 1, wherein:
the two-phase modulated command signals generated by the two-phase modulation module for the respective three-phases of the three-phase inverter is configured such that:
one of the two-phase modulated command signals is sequentially selected to be fixed to the lower limit thereof for each 120° electric angle of rotation of the rotary machine; and
the current measuring module is configured to measure a value of the current flowing through one of the first and second buses when a local minimum peak of the triangular carrier signal occurs while none of the high-side switching elements of all the three-phases are on or none of the low-side switching elements of all the three-phases are on.

6. The system according to claim 5, further comprising:
a dead time setter configured to, when the high-side switching element of a phase of the three-phase inverter is going to be switched from a first mode, in which the on-off operations thereof are performed, to a second mode in which the high-side switching element is fixed be off, and the low-side switching element of the phase is going to be switched from the first mode to a third mode in which the low-side switching element is fixed to be on, delay, by a dead time, a start edge on duration of the low-side switching element of the phase, and advance, by the dead time, an end edge of the on duration thereof, thus preventing simultaneous on of the high- and low-side switching elements of the phase.

7. The system according to claim 6, further comprising:
a disabling module configured to disable the measuring module from measuring a value of the current during each of the dead times.

8. The system according to claim 1, wherein:
the two-phase modulated command signals generated by the two-phase modulation module for the respective three-phases of the three-phase inverter is configured such that:
one of the two-phase modulated command signals is sequentially selected to be fixed to the upper limit thereof for each 120° electric angle of rotation of the rotary machine; and
the current measuring module is configured to measure a value of the current flowing through one of the first and second buses when a local maximum peak of the triangular carrier signal occurs while none of the high-side switching elements of all the three-phases are on or none of the low-side switching elements of all the three-phases are on.

9. The system according to claim 1, further comprising:
an offset-error measuring module configured to measure a value of the current flowing through one of the positive and negative buses as an offset error when a local peak of the triangular carrier signal occurs while either the high-side switching elements of all the three-phases or the low-side switching elements of all the three-phases are off; and
a correcting module configured to correct, based on the measured offset error, a value of the current measured by the measuring module.

10. The system according to claim 1, further comprising:
a second on-off performing module configured to compare in magnitude the triangular carrier wave with the three-phase command signals, thus performing, based on a result of the comparison, on-off operations of the high- and low-side switching elements of the three-phases, each of the three-phase command signals having a predetermined range defined by a lower limit and an upper limit thereof;
a selecting module configured to:
select the two-phase modulation module to perform the two-phase modulation and the on-off performing module to perform the on-off operations of the high- and low-side switching elements of the two phases corresponding to the first and second two-phase modulated command signals when a value of each of the three-phase command signals is within a first section of a corresponding one of the three-phase command signals,
the first section being defined to be equal to or higher than a first threshold level higher than the lower limit, and defined to be equal to or lower than a second threshold level higher than the first threshold level and lower than the upper limit; and
select the second on-off performing module to perform the on-off operations of the high- and low-side switching elements of the three-phases when a value of at least one of the three-phase command signals is within a second section of the at least one of the three-phase command signals,
the second section being defined to be one of:
a third section that is equal to or higher than the lower limit and to be lower than the first threshold level; and
a fourth section that is equal to or lower than the upper limit ant to be higher than the second threshold; and
a disabling module configured to disable the measuring module from measuring a value of the current while the second on-off performing module is selected to perform the on and off operations of the high- and low-side switching elements of the three-phases.

11. The system according to claim 1, further comprising:
a second on-off performing module configured to compare in magnitude the triangular carrier wave with the three-phase command signals, thus performing on-off operations of the high- and low-side switching elements of the three-phases, each of the three-phase command signals having a predetermined range defined by a lower limit and an upper limit thereof;
a selecting module configured to:
select the two-phase modulation module to perform the two-phase modulation and the on-off performing module to perform the on and off operations of the high- and low-side switching elements of the two phases corresponding to the first and second two-phase modulated command signals when a value of at least one of the three-phase command signals is within a first section of the at least one of the three-phase command signals,
the first section being defined to be equal to or higher than a threshold level higher than the lower limit, and defined to be equal to or lower than the upper limit; and
select the second on-off performing module to perform the on and off operations of the high- and low-side switching elements of the three-phases when a value of each of the three-phase command signals is within a remaining second section of a corresponding one of the three-phase command signals,
the second section being defined to be equal to or higher than the lower limit and to be lower than the threshold level; and
a disabling module configured to disable the measuring module from measuring a value of the current while the second on-off performing module is selected to perform the on and off operations of the high- and low-side switching elements of the three-phases.

12. The system according to claim 1, further comprising:
a command voltage setter configured to set three-phase command voltages each having a predetermined amplitude, the three-phase command voltages being required to adjust a controlled variable of the three-phase rotary machine to a request value as a feedforward manipulated variable for the controlled variable;
an identifying module configured to identify whether a value of the current flowing through one of the first and second buses is which of three-phase currents flowing in the three-phase rotary machine; and
an amplitude corrector configured to:
correct, based on a result of the identification and a value of the current measured by the measuring module, the amplitude of each of the three-phase command voltages, thus correcting a deviation of each of the three-phase currents from a corresponding one of three-phase command currents defined based on the three-phase command voltages; and
supply the three-phase command voltages whose amplitudes have been corrected to the two-phase modulation module as the three-phase command signals.

* * * * *